United States Patent [19]

Tsukamoto et al.

[11] Patent Number: 5,492,508
[45] Date of Patent: Feb. 20, 1996

[54] HYDRAULIC CONTROL SYSTEM FOR AN AUTOMATIC TRANSMISSION

[75] Inventors: Kazumasa Tsukamoto, Toyota; Masahiko Ando, Okazaki; Masahiro Hayabuchi; Toshihiro Kano, both of Anjo, all of Japan

[73] Assignee: Aisin Aw Co., Ltd., Japan

[21] Appl. No.: 308,107

[22] Filed: Sep. 16, 1994

[30] Foreign Application Priority Data

Sep. 17, 1993 [JP] Japan ................................. 5-232041

[51] Int. Cl.$^6$ .................................................. F16H 61/00
[52] U.S. Cl. .......................... 475/125; 475/120; 475/129; 475/123
[58] Field of Search ................................... 475/120, 123, 475/125, 129

[56] References Cited

FOREIGN PATENT DOCUMENTS

| | | |
|---|---|---|
| 354493 | 4/1989 | European Pat. Off. . |
| 2212666 | 8/1990 | Japan . |
| 3168466 | 7/1991 | Japan . |
| 3249468 | 11/1991 | Japan . |

*Primary Examiner*—Dirk Wright
*Attorney, Agent, or Firm*—Lorusso & Loud

[57] ABSTRACT

A controller of an automatic transmission provides gear changes with optimum gear change characteristics under any traveling conditions. The controller of the automatic transmission of the present invention includes an input torque detector for determining input torque to the transmission, an inertia torque estimator for estimating an inertia torque corresponding to the rate of change of rotary speed of a rotary member during a gear change, input torque corrector for calculating a required operating torque by adding the input torque and the inertia torque and an operating pressure controller for controlling operating pressure to correspond to the required operating torque. The operating pressure corresponding to the necessary engagement torque is supplied to a hydraulic servo, to effect a gear change, irrespective throttle opening and driving speed and irrespective of whether the gear change is made step by step or jumped.

11 Claims, 18 Drawing Sheets

FIG. 3

| Position | | Solenoid | | | | | | Clutch | | | Brake | | | | One-Way Clutch | | |
|---|---|---|---|---|---|---|---|---|---|---|---|---|---|---|---|---|---|
| | | S1 | S2 | S3 | S4 | SLU | SLN | C1 | C2 | C0 | B1 | B2 | B3 | B0 | F1 | F2 | F0 |
| P | | O | x | O | O | x | — | x | x | x | x | x | x | x | x | x | x |
| R | Normal | O | O | O | O | x | — | x | O | x | x | x | O | x | x | x | O |
| | Forbidden Time #1 | O | O | O | O | x | — | x | x | x | x | x | x | O | x | x | x |
| N | | O | x | O | O | x | — | x | x | *3 | x | x | x | *4 | x | x | x |
| | | *2 | | | | | | | | | | | | | | | | |
| 1st | Normal | O | x | O | O | x | — | O | x | O | x | x | x | x | O | x | O |
| | Engine Brake | O | O | O | O | x | △ | O | x | O | x | x | x | x | O | x | O |
| 2nd | Normal | O | x | O | x | ◎ | — | O | x | O | △ | O | x | x | x | O | O |
| | Engine Brake | O | O | O | x | ◎ | △ | O | x | O | x | O | x | x | x | x | O |
| D,2,L | 3RD | x | x | O | x | ◎ | — | O | O | O | x | x | x | x | x | x | O |
| | 4TH | x | x | x | x | ◎ | △ | O | O | x | x | O | x | O | x | x | x |
| | 1↔2 Shift | O | O | O | O | ◎ | △ | O | x | O | △ | O | x | x | △ | △ | O |
| | 2↔3 Shift | x | O | O | O | ◎ | △ | O | O | O | x | O | x | x | △ | x | O |
| | 3↔4 Shift | x | O | x | O | ◎ | △ | O | O | O | x | O | x | △ | x | x | △ |
| Control of Operating Pressure | | On | Off | On | Off | On:L-up On / Off:L-up Off | Control Duty Only During Shift | | | | Engage / Release | | | | Lock / Free | | |
| | | | | | | | | | | | Govern Pressure by Pressure Control Valve | | | | By Control Pressure | | |
| Remarks | | O | x | ◎ | △ | | | | | | | | | | | | |

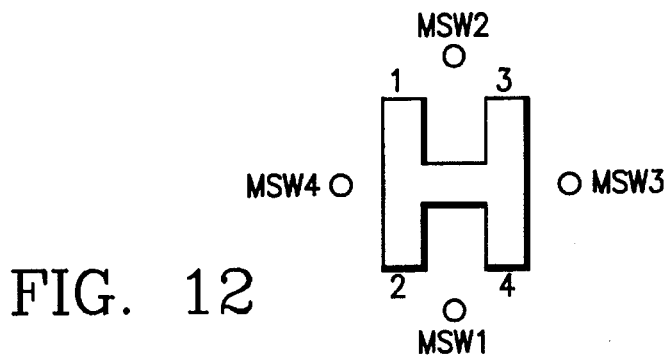
FIG. 12
| Shift Position | Manual Switch | | | |
|---|---|---|---|---|
| | MSW1 | MSW2 | MSW3 | MSW4 |
| D1 | X | O | X | O |
| D2 | X | O | O | X |
| D3 | O | X | X | O |
| D4 | O | X | O | X |
FIG. 13
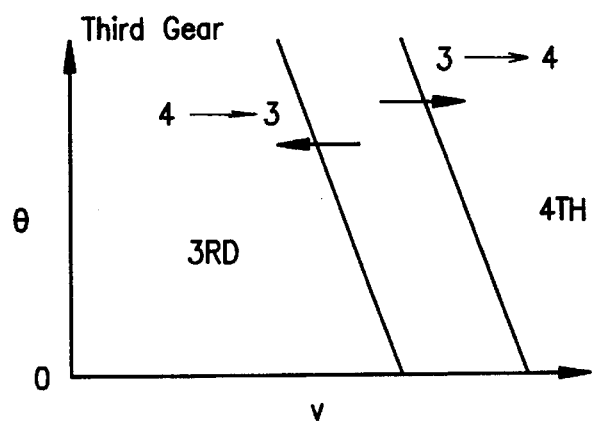
FIG. 14

5,492,508

HYDRAULIC CONTROL SYSTEM FOR AN AUTOMATIC TRANSMISSION

BACKGROUND OF THE INVENTION

1. Field of the Invention

The present invention relates to a hydraulic control system for an automatic transmission.

2. Description of Related Art

Conventionally, an automatic transmission has a gear box including a gear train and is constructed so as to input rotation at a first speed to a certain gear element in the gear train and to output rotation at a second speed from another gear element. Toward that end, a plurality of frictional engagement elements, such as clutches and brakes, are provided to selectively transmit the rotation between different combinations of gear elements by selectively engaging and disengaging the frictional engagement elements to provide a plurality of gear speed stages, each having a given operative combination of the gear elements.

In the case of a hydraulically controlled automatic transmission, each of the frictional engagement elements has a corresponding hydraulic servo. A gear speed change is effected by supplying oil to a hydraulic servo for a disengaged frictional engagement element to engage same and draining oil from a hydraulic servo for an engaged frictional engagement element to disengage same.

However, if oil is abruptly supplied to a hydraulic servo, its associated frictional engagement element will abruptly engage, thereby causing a gear change shock. Accordingly, gear change shock is reduced by supplying oil to the hydraulic servo with an appropriate transient characteristic.

Gear change shock caused by an excessive or deficient operating pressure may be also reduced, and life of the frictional engagement elements prolonged, by governing a line pressure in accordance with input torque to the transmission. In one such prior art control system, an input torque is estimated, based on a fuel injection pulse and engine speed, and a line pressure is governed in accordance with the estimated input torque to adjust operating pressure of a hydraulic servo to an adequate value (hereinafter referred to as "the first prior art automatic controller". See Japanese Patent Laid-Open no. Hei 1-116363.)

Another prior art control system governs a line pressure so that the elapsed time for a gear change agrees with a targeted value, which targeted value depends upon the frictional engagement elements involved in the gear change, deterioration of the oil and variables in manufacture (hereinafter referred to as "the second prior art controller". See Japanese Patent Laid-Open no. Hei 2-31069.)

Still another prior art automatic transmission controller has been provided which sets a targeted rotational speed locus (graph) for a rotary member involved in a gear change, which targeted locus is determined in accordance with the frictional engagement elements involved in the gear change, state of deterioration of oil and other variables in production, to control the operating pressure of a hydraulic servo so that the speed of revolution of the rotary member changes along the locus. (Hereinafter referred to as "the third prior art controller". See Japanese Patent Laid-Open no. 63-212137.)

In controllers of the prior art automatic transmissions described above, however, the gear change is slowed down if the gear change is made while traveling at high-speed and a large gear change shock results if the gear change is made while traveling in low-speed in the case of the first prior art controller.

Thus, while the first prior art controller governs the line pressure in accordance with the input torque to make the gear change by engaging the appropriate frictional engagement elements, the frictional engagement elements receive an inertia torque for changing the speed of revolution of the rotary members (hereinafter referred to as the "inertia phase") when the speed of revolution of the rotary members on the input side, such as the engine and torque converter, is changing. Therefore, the hydraulic servo is required to operate with higher operating pressure to account for the inertia torque which the frictional engagement elements receive.

The inertia torque can be generally represented by a value obtained by multiplying the moment of inertia of the rotary members by angular acceleration (change of speed of revolution) of the rotary members. Accordingly, even if the gear change is made with the same input torque, a larger inertia torque is generated when the speed of revolution of the input side rotary members is high and a smaller inertia torque is generated when the speed of revolution of the input side rotary members is low. As a result, the frictional engagement elements cannot receive a sufficiently large inertia torque while at high-speed, making the gear change slow, and do receive full inertia torque while traveling in low-speed, causing a large gear change shock.

In contrast, because the second and third prior art controllers have operating pressure of the hydraulic servo controlled to correspond to gear change time and speed of revolution of the rotary members in the inertia phase, a control gain has to be increased in order to have the operating pressure correspond to the large change in torque caused when the frictional engagement elements receive the inertia torque. However, the increase of the control gain prevents the operating pressure from being finely adjusted and from fully accommodating for deterioration of the frictional engagement elements and oil and variations in manufacturing.

Accordingly, it is an object of the present invention to solve the aforementioned problems of the prior art controllers by providing a controller for an automatic transmission which allows a gear change to be made favorably under any traveling conditions and to always provide the best gear change characteristics.

SUMMARY OF THE INVENTION

In order to achieve the aforementioned objects, the controller of the present invention includes hydraulic servos for engaging and disengaging frictional engagement elements, oil supplying means for supplying oil to the hydraulic servos to be activated for a given gear change step, input torque determining means for determining an input torque to the transmission, inertia torque estimating means for estimating an inertia torque as a function of change in the rotational speed (angular acceleration) of a rotary member during the gear change, input torque correcting means for calculating a required operating torque, by adding the input torque to the inertia torque, and operating pressure control means for controlling operating pressure to provide the required operating torque.

The input torque determining means determines an input torque to the transmission and the inertia torque estimating means estimates an inertia torque based on the change in rotational speed of a rotary member during gear change. The input torque correcting means calculates a required operating torque from the input torque received from the input torque determining means and the inertia torque received from the inertia torque estimating means and the operating pressure control means controls operating pressure to provide the required operating torque calculated by the input torque correcting means.

Accordingly, because the operating pressure corresponding to the required operating torque is provided to the hydraulic servo, a gear change can be effected irrespective of throttle opening and driving speed and regardless of whether the gear change is made step by step or jumped, thus allowing a gear change to be favorably made in any traveling conditions and to always obtain the best gear change characteristics.

BRIEF DESCRIPTION OF THE DRAWINGS

FIG. 3 is a table showing control operations of the automatic transmission in accordance with the present invention;

FIG. 12 is a drawing illustrating a manual switch which may be utilized in the present invention;

FIG. 13 is a table of manual switch shift positions according to an embodiment of the present invention;

FIG. 14 is a speed change map (graph) suitable for use in the present invention;

DETAILED DESCRIPTION OF PREFERRED EMBODIMENTS

Figure 1:
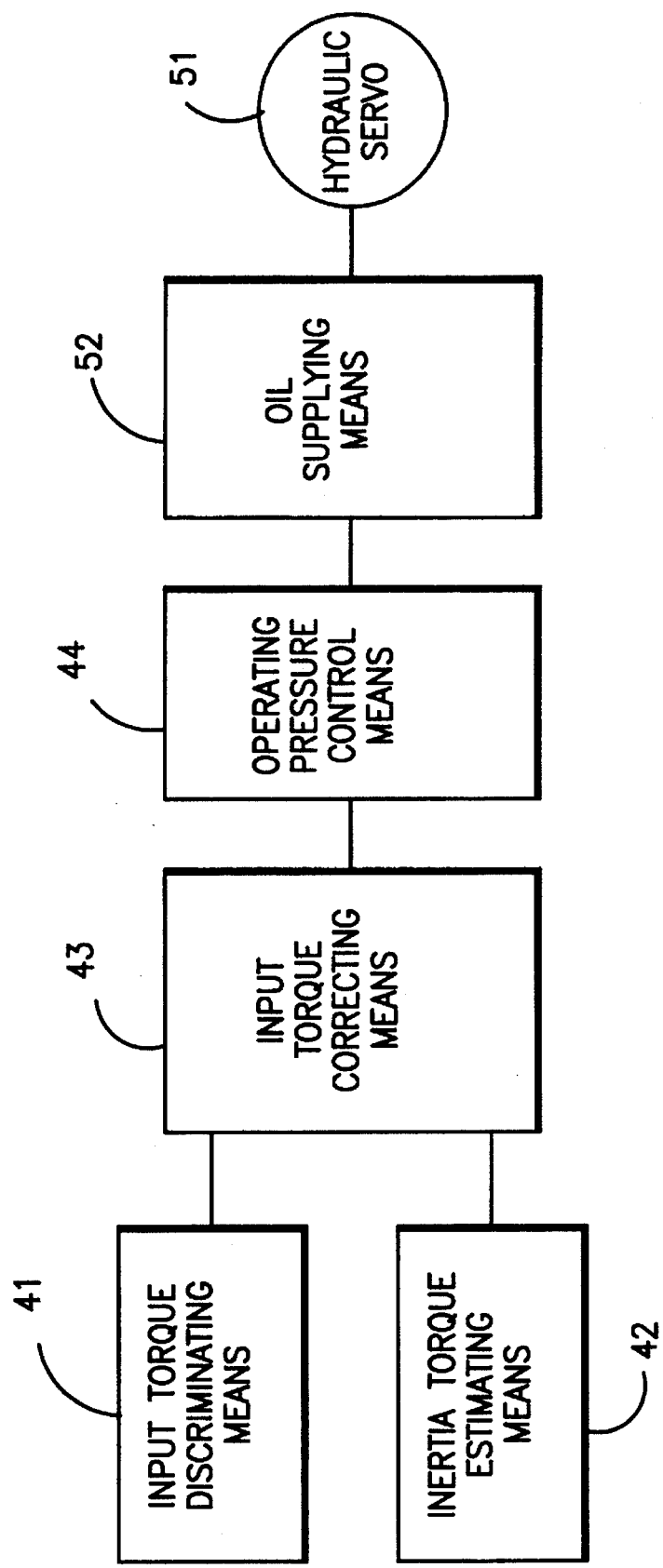
FIG. 1 is a block diagram of a controller of an automatic transmission according to an embodiment of the present invention.

Referring now to the drawings, preferred embodiments of the present invention will be explained in detail.

In FIG. 1, 41 denotes an input torque determining means for determining an input torque to the transmission, 42 is inertia torque estimating means for estimating an inertia torque corresponding to the change in rotational speed of a rotary member during a gear change, 43 is input torque correcting means for calculating a required operating torque by adding the input torque and the inertia torque, 44 is operating pressure control means for controlling the operating pressure to correspond to the required operating torque, 51 is a hydraulic servo for engaging and disengaging a frictional engagement element (not shown) and 52 is oil supplying means for supplying oil to the hydraulic servo for a gear change step.

While the hydraulic servo 51 represents hydraulic servos B-0 through B-3 and C-0 through C-2 described later, yet another servo may be included, depending on the structure of the transmission.

The input torque determining means 41 determines input torque to the transmission and the inertia torque estimating means 42 estimates the inertia torque corresponding to the change in the rotational speed of a rotary member during a gear change (angular acceleration). The input torque correcting means 43 then calculates a required operating torque based on the input torque received from the input torque determining means 41 and the inertia torque received from the torque estimating means 42 and the operating pressure control means 44 controls the operating pressure to correspond to the required operating torque calculated by the input torque correcting means 43.

Accordingly, because the operating pressure corresponding to the required operating torque is fed to the hydraulic servo 51, the operating pressure required for a gear change can be supplied to the hydraulic servo 51 regardless of throttle opening and driving speed and regardless of whether the gear change is made step by step or jumped, thus allowing the gear change to be favorably made under any traveling conditions and to always provide the best gear change characteristics.

Figure 2:
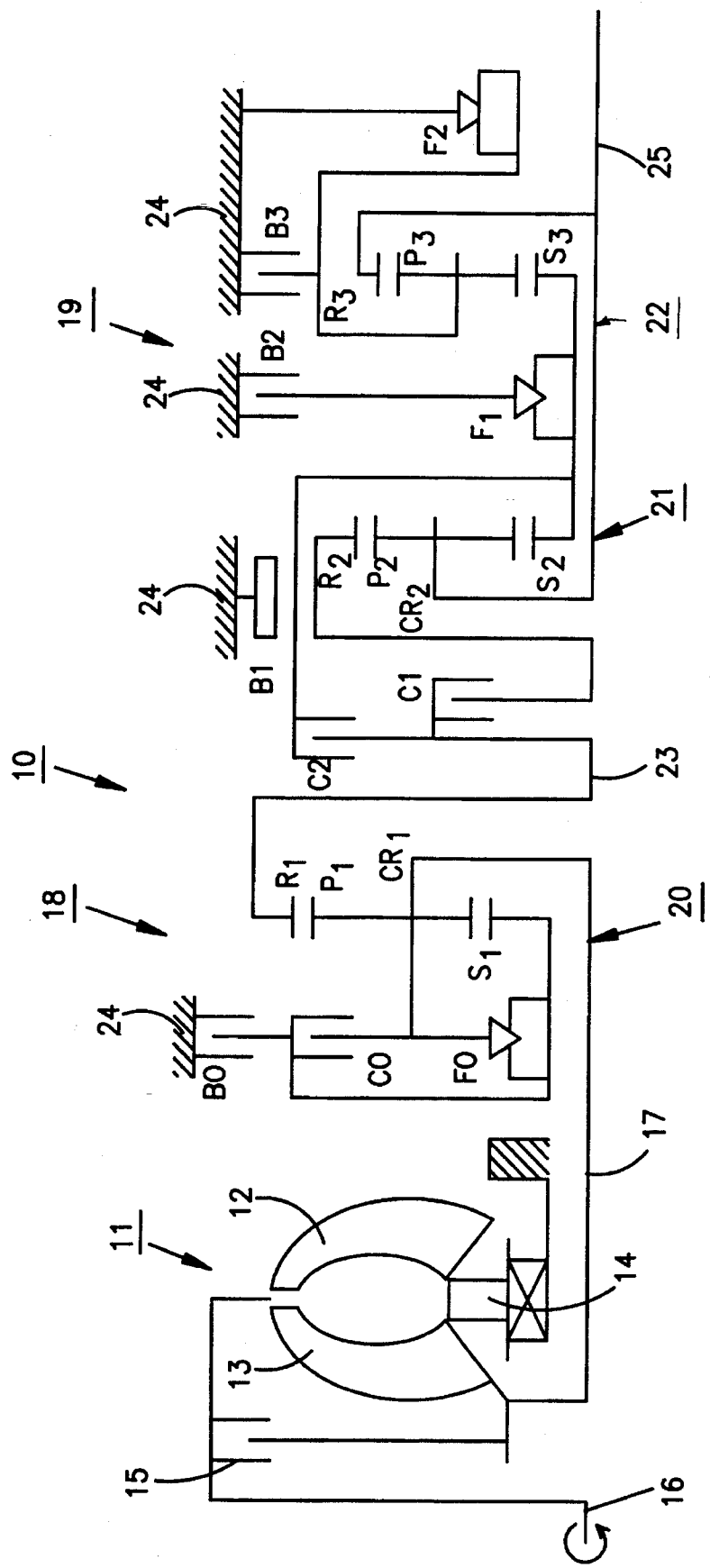
FIG. 2 is a schematic diagram of an automatic transmission controlled by the controller of FIG. 1.

In FIG. 2, the automatic transmission is shown as including a transmission (T/M) 10 and a torque converter 11, wherein rotation generated by an engine (not shown) is transmitted to the transmission 10, which changes the rotational speed, and then to driving wheels (not shown).

The torque converter 11 includes a pump impeller 12, turbine runner 13 and stator 14, as well as a lock-up clutch 15 for improving a power transmission efficiency, and transmits rotation of an input member 16 which is an output shaft of the engine to an input shaft 17 of the transmission 10, indirectly by a flow of oil within the torque converter 11 or directly by locking the lock-up clutch 15.

The transmission 10 includes a sub-gear change unit 18 and main gear change unit 19. The sub-gear change unit 18 has an overdrive planetary gear unit 20 and the main gear change unit 19 has a front planetary gear unit 21 and rear planetary gear unit 22.

The overdrive planetary gear unit 20 includes a carrier $CR_1$ supporting a pinion $P_1$ connected to the input shaft 17, sun gear $S_1$ surrounding the input shaft 17 and ring gear $R_1$ linked to an input shaft 23 of the main gear change unit 19. The carrier $CR_1$ and the sun gear $S_1$ are linked via a third clutch C0 and a third one-way clutch F0 and the sun gear $S_1$ and a case 24 area linked via a fourth brake B0.

The front planetary gear unit 21 includes a carrier $CR_2$ supporting a pinion $P_2$ connected to an output shaft 25, sun gear $S_2$ surrounding the output shaft 25 and is integrally formed with a sun gear $S_3$ of the rear planetary gear unit 22 and ring gear $R_2$ linked to the input shaft 23 via a first clutch C1. The input shaft 23 and the sun gear $S_2$ are linked via a second clutch C2 and the sun gear $S_2$ and the case 24 are linked via a first brake B1 which is a band brake. The sun gear $S_2$ and the case 24 are further linked via a first one-way clutch F1 and second brake B2.

The rear planetary gear unit 22 includes a carrier $CR_3$ supporting a pinion $P_3$, sun gear $S_3$ and ring gear $R_3$ integral with the input shaft 25. The carrier $CR_3$ and the case 24 are linked via a third brake B3 and second one-way clutch F2 provided in parallel.

Solenoid valves S1 through S4, linear solenoid valves SLU and SLN, first clutch C1, second clutch C2, third clutch C0, first brake B1, second brake B2, third brake B3, fourth brake B0, first one-way clutch F1, second one-way clutch F2 and third one-way clutch F0 in the aforementioned automatic transmission are controlled in each gear change step of P-range, R-range, D-range, 2-range and L-range, respectively, as shown in FIG. 3. "Forbidden time *1" in FIG. 3, is a discriminating speed at which driving in the R-range is prohibited and is set at 20 km/h. "*2" signifies that no gear change occurs in N-range because D-range hydraulic pressure is not applied. Shifts D→N and N→D are controlled by the solenoid valves S1 through S4 in accordance with the driving speed and a solenoid pattern in the D-range. "*3" indicates that the third clutch C0 is engaged in the first to third speeds and "*4" indicates that the fourth brake B0 is engaged in the fourth speed.

During the first speed in the D-range, 2-range and L-range, the first clutch C1 and third clutch C0 are engaged and the second one-way clutch F2 and third one-way clutch F0 are locked. Therefore, in the overdrive planetary gear unit 20, the transmission is directly coupled via the third clutch C0 and third one-way clutch F0 and the rotation of the input shaft 17 is transmitted to the main gear change unit 19 as is. Further, in the main gear change unit 19, the rotation of the input shaft 23 is transmitted to the ring gear $R_2$ of the front planetary gear unit 21 via the first clutch C1, to the carrier $CR_2$ and to the output shaft 25 which is integral with the carrier $CR_2$. The input shaft rotation tries to give torque to the carrier $CR_3$ of the rear planetary gear unit 22 via the sun gears $S_2$ and $S_3$, but rotation of the carrier $CR_3$ is blocked by the locked engagement of the second one-way clutch F2. Accordingly, the pinion $P_3$ autorotates and transmits the decelerated rotation to the ring gear $R_3$ which is integral with the output shaft 25.

During the second speed in the D-range, 2-range and L-range, the first clutch C1, third clutch C0 and second brake B2 are engaged and the first one-way clutch F1 and third one-way clutch F0 are locked. Therefore, in the overdrive planetary gear unit 20, the direct coupling is maintained and the rotation of the input shaft 17 is transmitted to the input shaft 23 of the main gear change unit 19 as is. In the main gear change unit 19, the rotation of the input shaft 23 is transmitted to the ring gear $R_2$ of the front planetary gear unit 21 via the first clutch C1. The input shaft rotation tries to give torque to the sun gear $S_2$ via the pinion $P_2$, but it is blocked because the first one-way clutch F1 is locked along with the engagement of the second brake B2. Accordingly, the carrier $CR_2$ rotates while autorotating the pinion $P_2$ and the second speed rotation is transmitted to the output shaft 25 only via the front planetary gear unit 21.

During the third speed in the D-range, 2-range and L-range, the first clutch C1, second clutch C2, third clutch C0 and second brake B2 are engaged and the third one-way clutch F1 is locked. Therefore, in the overdrive planetary gear unit 20, the direct coupling state is maintained and the rotation of the input shaft 17 is transmitted to the input shaft 23 of the main gear change unit 19 as is. In the main gear change unit 19, the front planetary gear unit 21 is put into a direct coupling state as the first clutch C1 and second clutch C2 are engaged and the rotation of the input shaft 23 is transmitted to the output shaft 25 as is.

During the fourth speed, i.e. the fastest speed, in the D-range, 2-range and L-range, the first clutch C1, second clutch C2, second brake B2 and fourth brake B0 are engaged. In the main gear change unit 19, the third clutch C0 is released and the fourth brake B0 is engaged. Accordingly, the sun gear $S_1$ of the overdrive planetary gear unit 20 is locked by the engagement of the fourth brake B0, the carrier $CR_1$ rotates and transmits the rotation while autorotating the pinion $P_1$ and the rotation of the overdrive is transmitted to the input shaft 23 of the main gear change unit 19 which is in the direct coupling state.

Next, the controller of the automatic transmission will be explained with reference to FIG. 4 which is a schematic diagram of an embodiment of the controller of the present invention.

Figure 4:
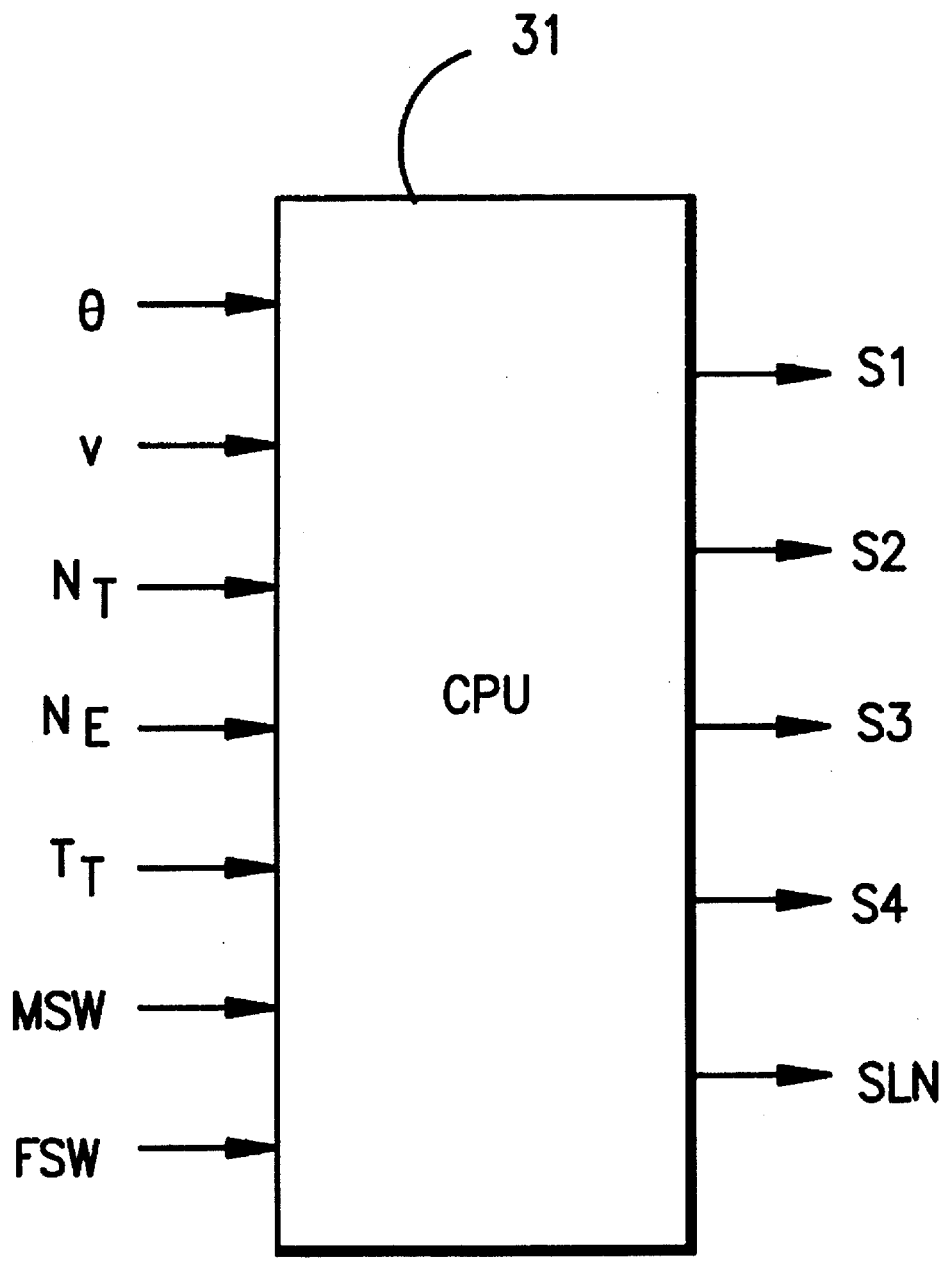
FIG. 4 is a schematic diagram of the CPU of the controller of the present invention.

In FIG. 4, 31 denotes a CPU for controlling the whole controller of the automatic transmission, to which a throttle opening theta (θ), driving speed v, rotary speed of the input shaft 17 (FIG. 2) (hereinafter referred to as "the input rotary speed") $N_T$, engine speed $N_E$, input torque $T_T$ and other detection signals are input. Also input to the CPU 31 are a manual switch signal (MSW) and a gear change feel select signal (FSW).

The CPU 31 controls the solenoid valves S1 through S4 and linear solenoid valve SLN, etc. The solenoid valve S1 switches a 2–3 shift valve (not shown), solenoid valve S2 switches a 1–2 shift valve and 3–4 shift valve (not shown), solenoid valve S3 switches a B-1 timing valve (not shown) and solenoid valve S4 switches an engine brake control valve (not shown). The linear solenoid valve SLN operates a pressure control valve (not shown).

The CPU 31 determines a traveling mode for the vehicle, based on the detection signals, and, in accordance with the determined travelling mode, controls the linear solenoid valve SLN, controls operating pressure for the hydraulic servo 51 (FIG. 1) and back pressure of an accumulator (not shown) to engage the frictional engagement elements such as the first clutch C1, second clutch C2, third clutch C0, first brake B1, second brake B2, third brake B3 and fourth brake B0.

Next, the CPU 31 will be explained with reference to FIGS. 5, 6 and 7.

Figure 5:
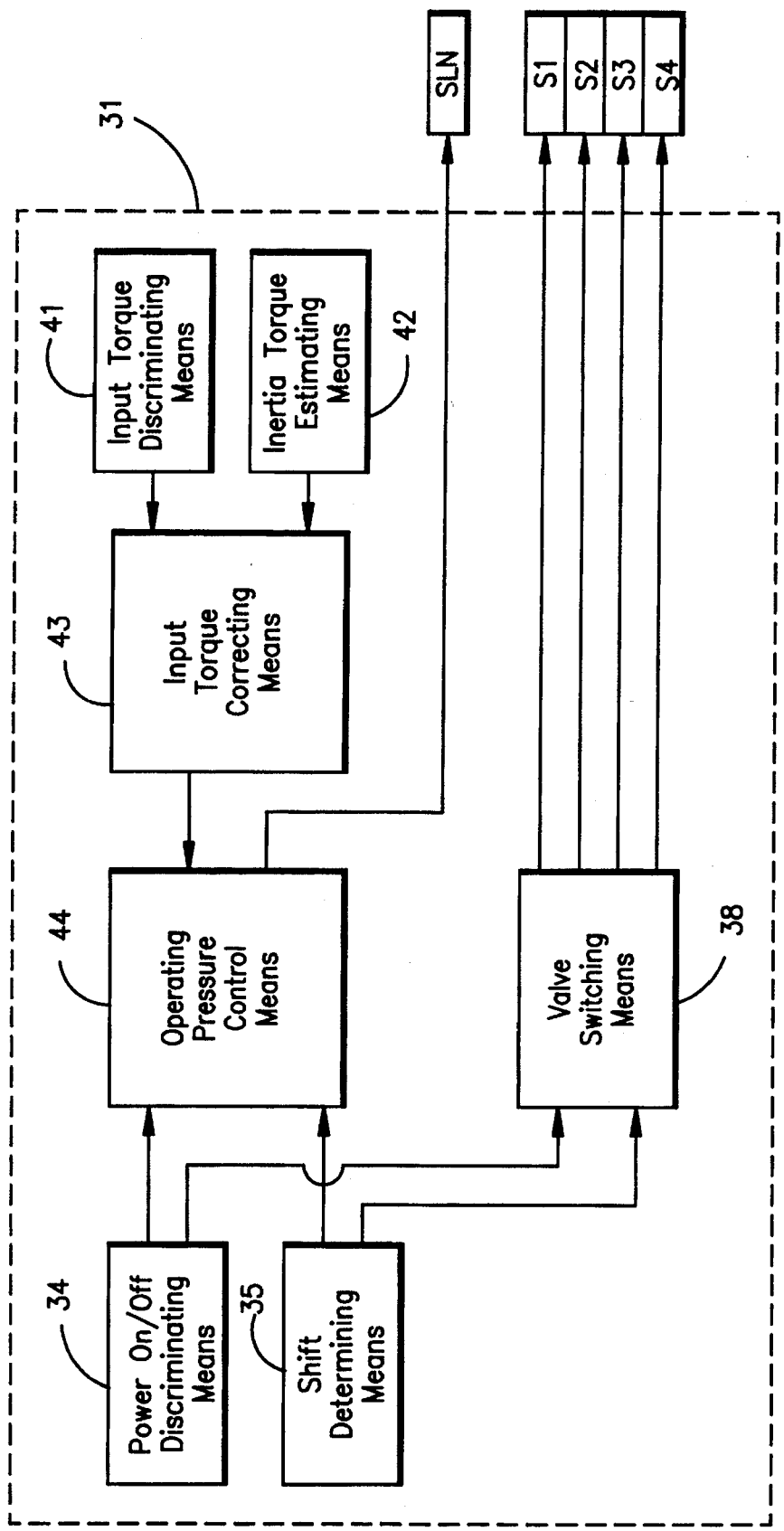
FIG. 5 is another block diagram of the controller of the automatics transmission according to an embodiment of the present invention.
Figure 6:
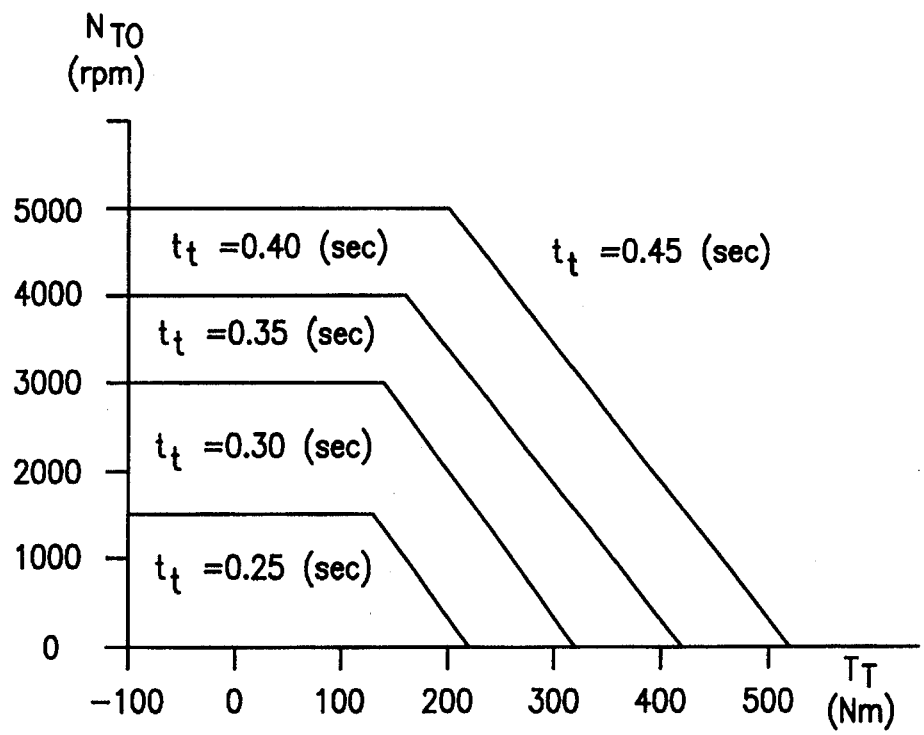
FIG. 6 is a graph showing a targeted gear change time map in accordance with the present invention.
Figure 7:
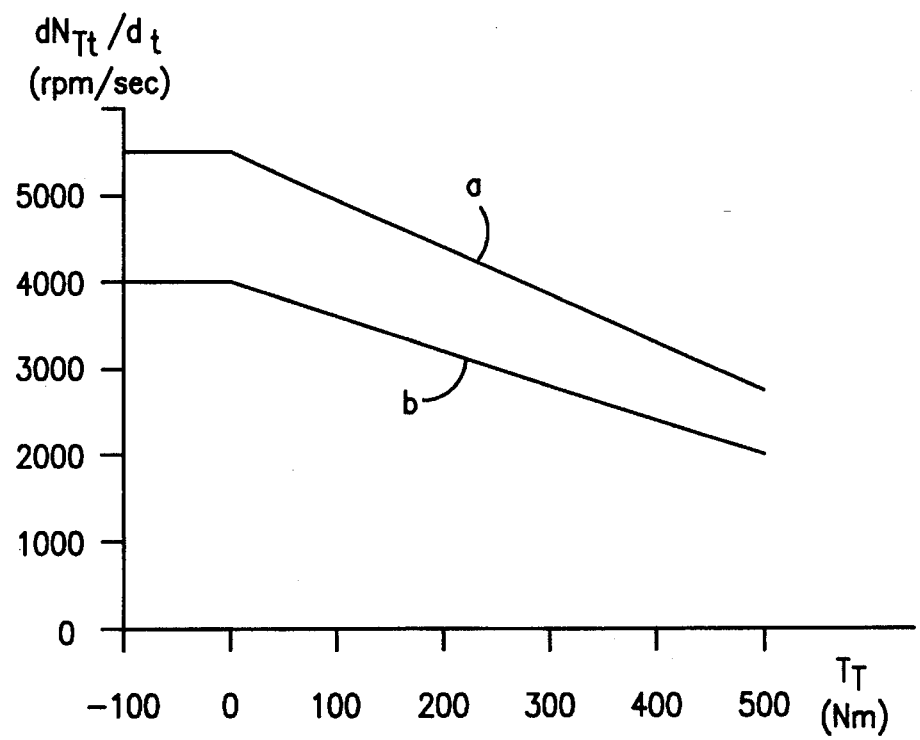
FIG. 7 is a graph showing a targeted rotational acceleration map which may be utilized in the present invention.

In FIGS. 5, 6 and 7, the reference numeral 31 denotes the CPU, 34 is a power on/off discriminating means for determining whether the vehicle is in a power-on state. The power on/off discriminating means 34 determines whether an accelerator pedal (not shown) is being depressed or not and determines that the vehicle is in the power-on state when the pedal is being depressed and that the vehicle is power-off state when the pedal is not being depressed.

Shift determining means 35 determines whether an up-shift gear change or down-shift gear change is to be made, valve switching means 38 controls the solenoid valves S1 through S4, in accordance with the determination of the power on/off discriminating means 34 and the determination made by the shift determining means 35, and input torque determining means 41 determines the input torque to the automatic transmission.

The input torque determining means 41 includes a torque sensor (not shown) mounted on the input shaft 17 (FIG. 2) for direct detection of the input torque $T_T$. The input torque determining means 41 also has the capability of estimating the input torque $T_T$ by information from another CPU which controls the engine (not shown) and of estimating the input torque $T_T$ from the input and output rotary speeds of the torque converter 11.

The reference numeral 42 denotes an inertia estimating means for estimating an inertia torque during a gear change. The rotation of the rotary members on the input side of the frictional engagement elements (not shown) which are engaged during a gear change creates the inertia torque as that rotation changes as frictional engagement elements are engaged. A targeted input rotary speed $N_{Tt}$ is calculated from the input rotary speed when a gear change is started $N_{TO}$ (hereinafter referred to as "the input rotary speed at the gear change starting time") multiplied by the ratio of gear steps before and after the gear change $i_t/i_o$. The difference between the targeted input rotary speed $N_{Tt}$ and the input rotary speed at the gear change starting time is divided by a targeted gear change time $t_t$ to calculate an input rotary speed change rate $dN_T/dt$ for the gear change, and the input rotary speed change rate $dN_T/dt$ is multiplied by a constant, equivalent to the moment of inertia I of the rotary members on the input side, to obtain an inertia torque $T_I$.

Although the input rotary speed $N_T$ is described above as a detected rotary speed of a rotary member on the input side and is used with the rate of change of the input rotary speed $N_T$ to estimate the inertia torque $T_I$, the inertia torque $T_I$ may also be estimated utilizing, not the change of the input rotary speed $N_T$, but, instead, the engine speed $N_E$ and the rate of change of rotary speed of a clutch drum or brake drum (not shown) of a frictional engagement element of the transmission 10.

The targeted gear change time $t_t$ is set to respond to the input rotary speed $N_T$ or the rotary speed of a rotary member on the output side of the frictional engagement element, e.g. the output shaft of the automatic transmission, propeller shaft (not shown) or wheels (not shown), in a manner suitable for the thermal capacity of the frictional engagement element or the desired gear change feel.

A targeted gear change time $t_t$ is created for each gear change step and may be set by reading from a targeted gear change time map having, as parameters, the input torque $T_T$ and the input rotary speed $N_{TO}$, a targeted gear change time map having as its only parameter the input rotary speed $N_{TO}$ or a targeted gear change time map having, as parameters, the input rotary speed $N_{TO}$ and gear step ratio $i_t/i_o$, as shown in FIG. 6. "$i_t$" is the targeted gear ratio (gear ratio after the gear change) and "$i_o$" is the gear ratio at the start of the gear change. The inertia torque estimating means 42 need not repeatedly calculate the input rotary speed change rate $dN_T/dt$ but, rather, can read the inertia torque $T_I$ from a map as shown in FIG. 7 prepared beforehand by calculation of targeted rotary speed rate of change $dN_T/dt$. In FIG. 7, the symbol "a" denotes the targeted rotary speed rate of change $dN_T/dt$ when the gear change feel indicated by the feel select signal FSW is hard and "b" the targeted rotary speed rate of change $dN_T/dt$ when the gear change feel indicated by the gear change feel select signal FSW is soft. Incidentally, the targeted rotary speed rate of change $dN_T/dt$ when a down-shift gear change is made in the power-off state may be set at a constant value. The driving speed v may be also utilized as a parameter.

In any case, the shortest possible targeted gear change time $t_t$ is set to provide that the amount of heat generated within frictional engagement elements during gear change stays within a permissible range. The driver may select either a driving mode in which a small gear change shock is generated or a driving mode in which no gear change shock is generated, by providing a switch (not shown) for switching the targeted gear change time $t_t$.

Input torque correcting means 43 corrects the input torque $T_T$ based on the determination by the input torque determining means 41 and the result of estimation by the inertia torque estimating means 42 to calculate a required operating torque $T_{TM}$. Operating pressure control means 44 controls operating pressure by the linear solenoid valve SLN based on the determination by the power on/off discriminating means 34 and the determination by the shift determining means 35.

More specifically, the inertia torque $T_I$ estimated by the inertia torque estimating means 42 is added to the input torque $T_T$ determined by the input torque determining means 41 to calculate the required operating torque $T_{TM}$ for each frictional engagement element. Then the line pressure is governed to correspond to the required operating torque $T_{TM}$, i.e. to produce a controlled pressure, and oil at that controlled pressure is supplied to each hydraulic servo 51 (FIG. 1) for engagement of an associated frictional engagement element.

To that end, various hydraulic pressure control maps having the required operating torque $T_{TM}$ as one parameter are prepared and the current value of the linear solenoid valve SLN is set by reading the hydraulic pressure control maps.

Because the operating pressure required for gear change can be thus supplied to the hydraulic servo 51, irrespective of throttle opening (θ) and driving speed v and irrespective of whether the gear change is made step by step or jumped, the gear change can be favorably made under any traveling conditions and the best gear change characteristics can always be obtained.

The inertia torque $T_I$ may be calculated by providing a locus (graphed plot) of the input rotary speed $N_{Tt}$ and by following the locus. In this case, because the hydraulic pressure is controlled so that it corresponds to the inertia torque $T_I$, the operating pressure closely approaches the value actually needed and more stable gear change characteristics can be obtained.

Although the engaging pressure control means 44 governs the line pressure by the linear solenoid valve SLN to provide a controlled pressure supplied to the hydraulic servo 51 of each frictional engagement element, the controlled pressure may be supplied not to the hydraulic servo 51 but to a back pressure chamber of an accumulator (not shown), in communication with hydraulic servo 51, to control the back pressure of the accumulator.

While the required operating torque $T_{TM}$ is the sum of the input torque $T_T$ the inertia torque $T_I$ only when a gear change is made, $T_{TM}$ is equal to the input torque $T_T$ (alone) during normal traveling. Accordingly, the line pressure may be governed to correspond to the traveling condition and the demand on the oil pump (not shown) which produces the line pressure may be reduced to reduce engine power loss.

Next, the operation of the controller of the automatic transmission constructed as described above will be explained with reference to FIG. 8.

- Step S1: Determination of the input torque $T_T$ by the input torque determining means 41 (FIG. 5).
- Step S2: Determination of whether the vehicle is in the power on or off state by the power on/off discriminating means 34.
- Step S3: Determination by the shift determining means 35 of whether an up-shift gear change is to be made or down-shift gear change is to be made.
- Step S4: Determination of whether a gear change command is being issued or not. When a gear change command is being issued, the processing advances to Step S5 and when no gear change command is being issued, processing returns to Step S1.
- Step S5: The inertia torque estimating means 42 estimates the inertia torque $T_I$ and the input torque correcting means 43 corrects the input torque $T_T$ to calculate the required operating torque $T_{TM}$.
- Step S6: The engaging pressure control means 44 controls the linear solenoid valve SLN, based on the hydraulic pressure control map, to provide a controlled pressure. On the other hand, the solenoid valves S1 through S4 are controlled by the valve switching means 38.
- Step S7: Determination of whether the gear change has been finished or not. If the gear change has been finished, the processing is ended and when the gear change has not been finished, the processing returns to Step S1.

Figure 8:
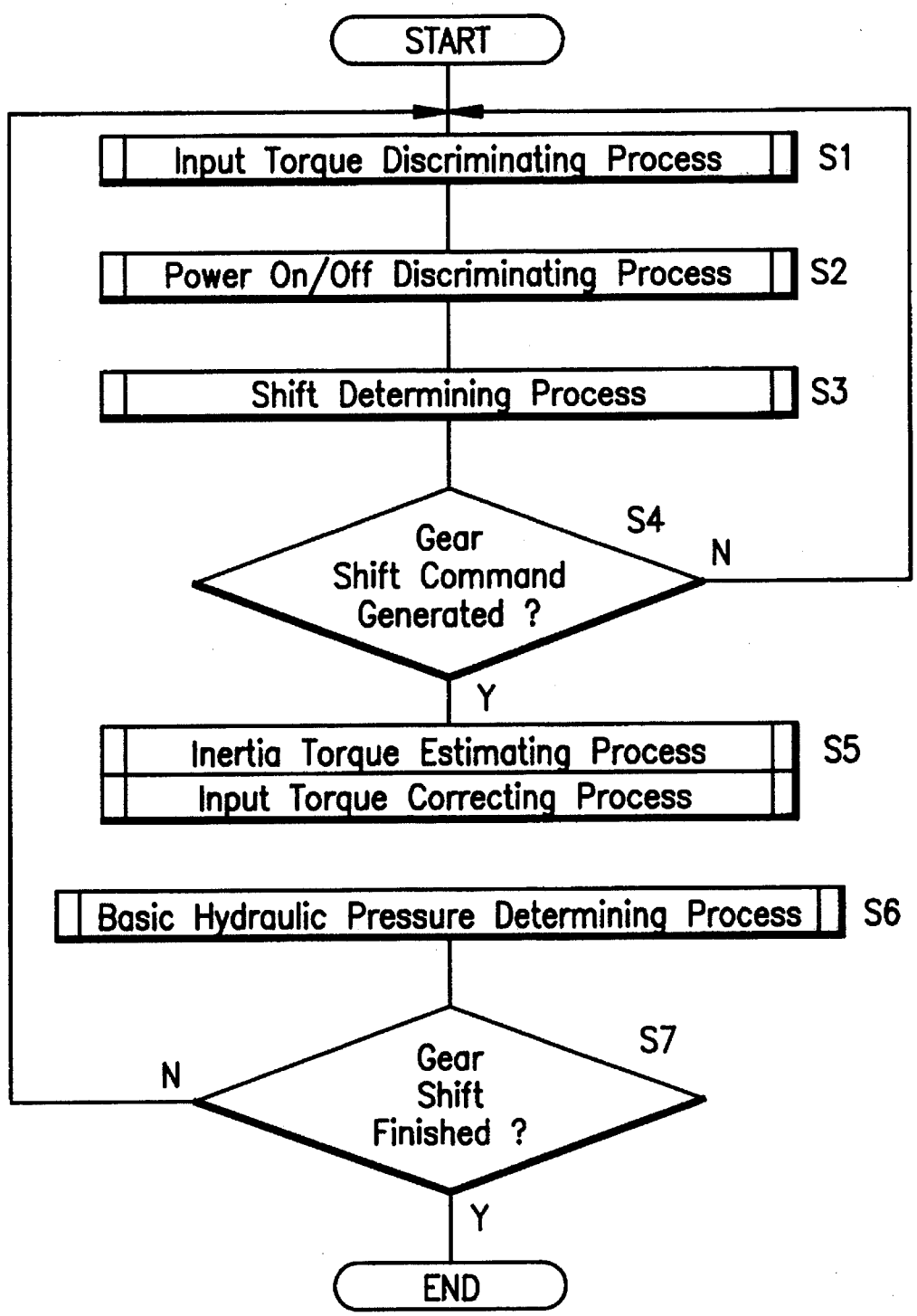
FIG. 8 is a main flowchart showing the operation of the controller of the automatic transmission according to the present invention.
Figure 9:
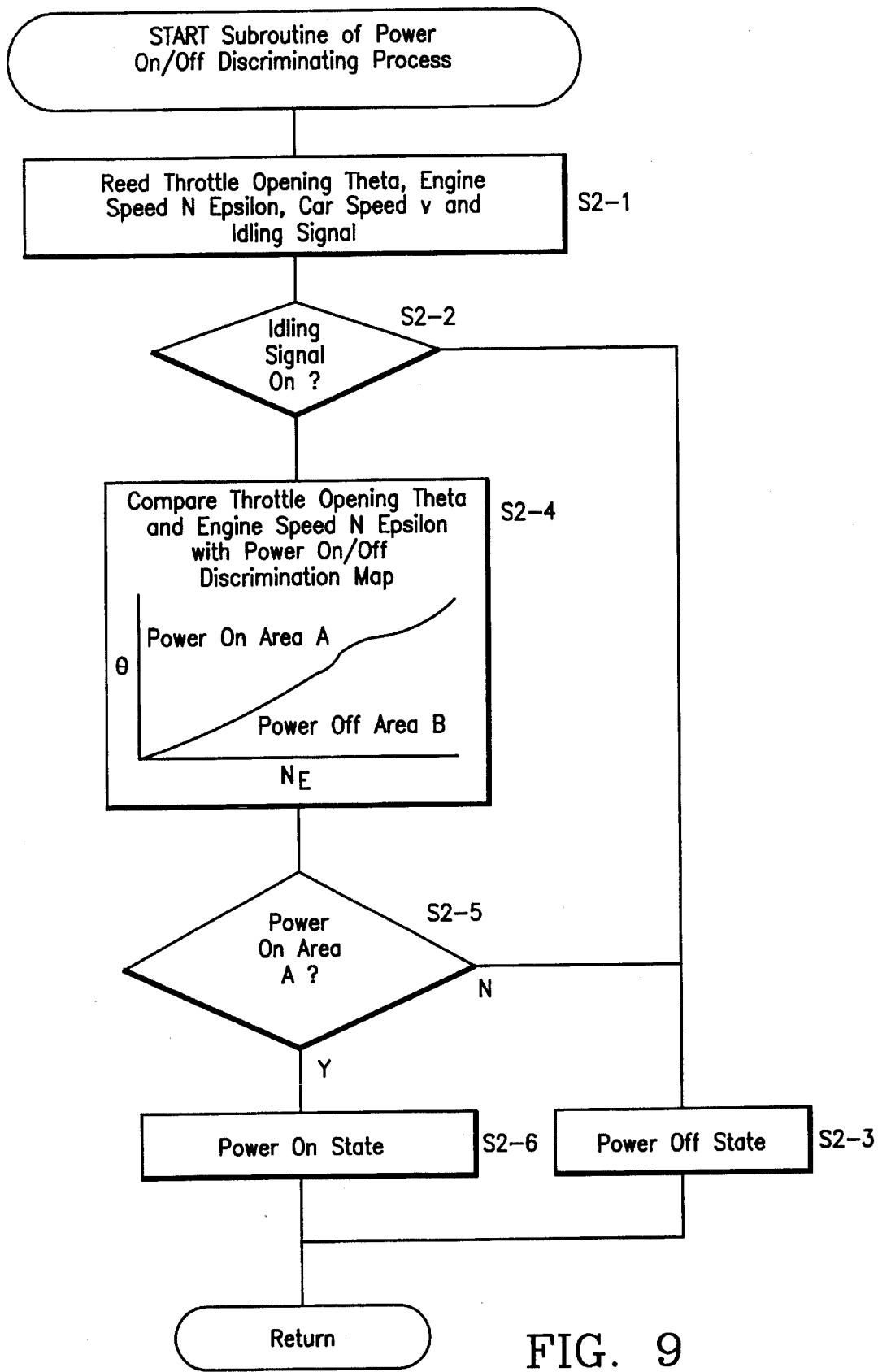
FIG. 9 is a flowchart of a subroutine of a power on/off discriminating process used in the control system of the present invention.

Next, a subroutine for the power on/off determination process made by the power on/off discriminating means 34 in Step S2 in FIG. 8 will be explained with reference to FIG. 9.

- Step S2-1: Read the throttle opening θ, engine speed $N_E$, driving speed v and idling signal.
- Step S2-2: Determine whether or not the idling signal is on. When it is on, it is apparent that the accelerator pedal (not shown) is not being depressed and processing advances to Step S2-3. When it is off, processing advances to Step S2-4.
- Step S2-3: Determination that the vehicle is in the power off state.
- Step S2-4: Compare the throttle opening theta (θ) and engine speed $N_E$ with the power on/off discrimination map. In this case, the power on/off discrimination map has a power-on area A and power-off area B in a graph of the throttle opening theta (θ) versus engine speed $N_E$.
- Step S2-5: Determine whether or not the point for the detected throttle opening theta (θ) and engine speed $N_E$ falls within the power-on area A. When it falls within the power-on area A, advance to Step S2-6 and when it falls within the power-off area B, advance to Step S2-3.
- Step S2-6: Determination of the power on state.

Incidentally, the power-on state or power-off state may be determined by reference to the input torque $T_T$.

Figure 10:
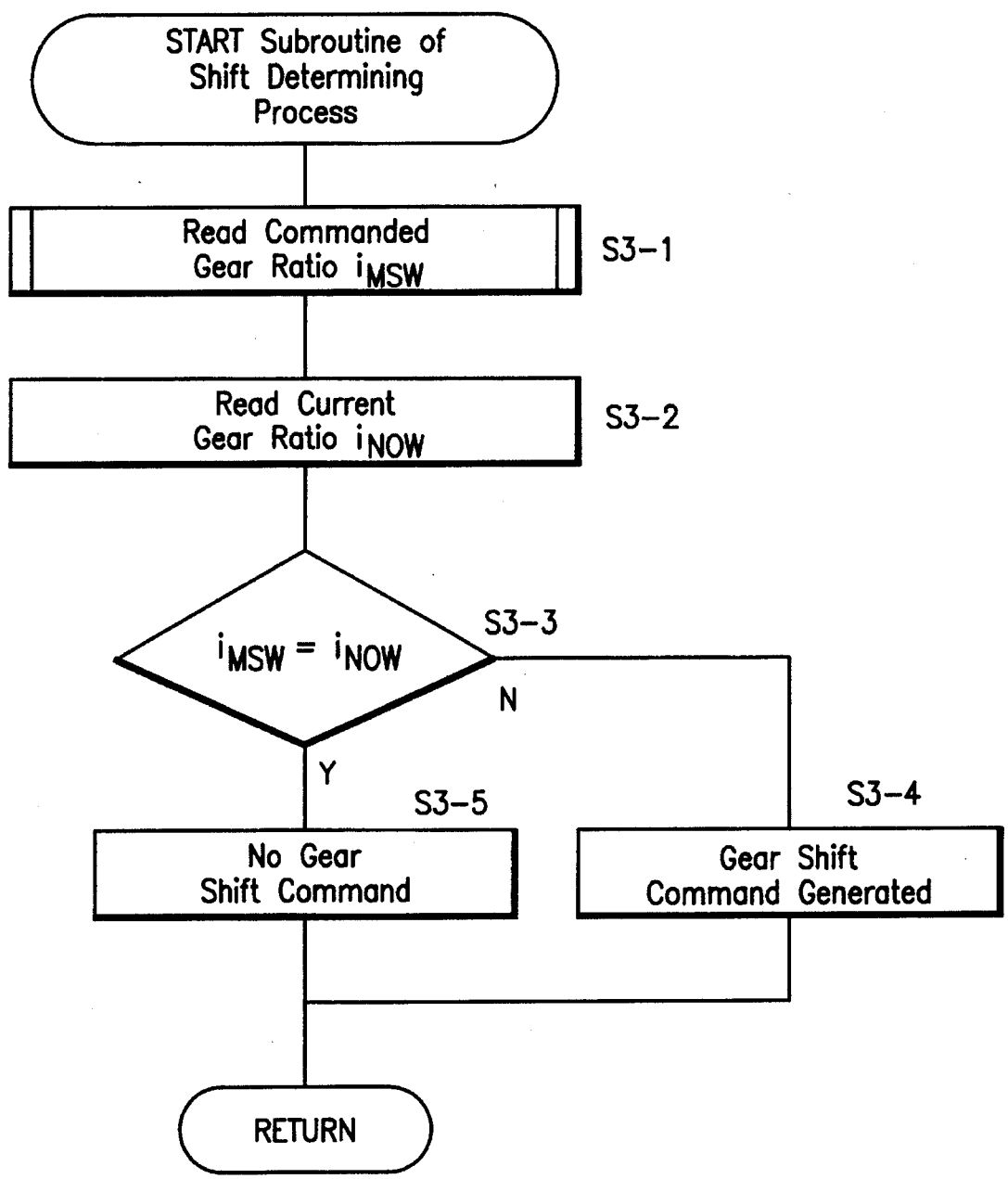
FIG. 10 is a flowchart of a subroutine of a shift determining process which may be utilized in the present invention.
Figure 11:
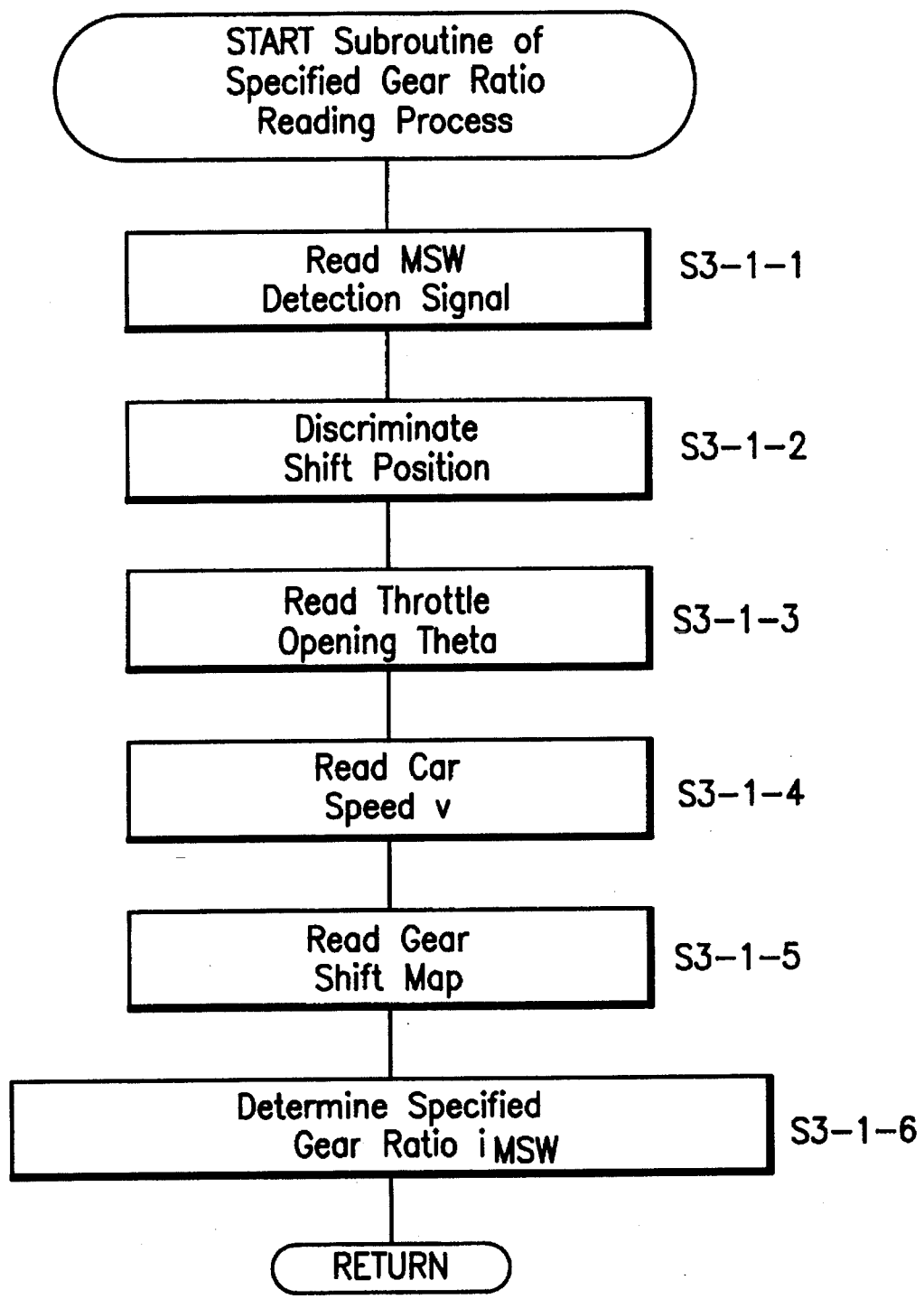
FIG. 11 is a flowchart of a subroutine of a commanded gear ratio reading process in the present invention.

Next, a subroutine for the shift determining process performed by the shift determining means 35 (FIG. 5) in Step 3 in FIG. 8 will be explained with reference to FIG. 10.

- Step S3-1: Read a gear ratio for the targeted gear change selected by shift lever operation (hereinafter referred to as "the commanded gear ratio") $i_{MSW}$.
- Step S3-2: Read the current gear ratio (during a gear change, "the current gear ratio" will be the gear ratio before the gear change) $i_{NOW}$.
- Step S3-3: Determine whether or not the commanded gear ratio $i_{MSW}$ and the current gear ratio $i_{NOW}$ are equal. When the commanded gear ratio $i_{MSW}$ and the current gear ratio $i_{NOW}$ are equal, advance to Step S3-5 and when the commanded gear ratio $i_{MSW}$ and the current gear ratio $i_{NOW}$ are not equal, advance to Step S3-4.
- Step S3-4: Issue a gear change command to change gear to the commanded gear ratio $i_{MSW}$.
- Step S3-5: Issue no gear change command.

Incidentally, while a gear change inhibiting and limiting logic (not shown) is provided in the subroutine of the actual shift determining process as a protection against overrunning of the engine (not shown) and against exceeding the thermal capacity of the frictional engagement elements (not shown), its explanation will be omitted here.

Next, a subroutine for the commanded gear ratio reading step in Step S3-1 in FIG. 10 will be explained with reference to FIGS. 11–14.

- Step S3-1-1: Read detection signals from the manual switches MSW1 through MSW4. As shown in FIG. 12, the manual switch MSW1 is turned on when a shift lever (not shown) is moved rearward (lower side in the figure), the manual switch MSW2 is turned on when the shift lever is moved forward (upper side in the figure), the manual switch MSW3 is turned on when the shift lever is moved to the right (right side in the figure) and the manual switch MSW4 is turned on when the shift lever is moved to the left (left side in the figure).

Although a shift lever is described above as the shift manipulating means, push button switches may be used instead of the shift lever. Further, the shift determination can be made by using gear change patterns in an automatic gear change such as a fuzzy gear change point control.

- Step S3-1-2: Determine a shift position by reference to the discrimination table in FIG. 13 and applying the detection signals from the manual switches MSW 1 through 4.

In FIG. 13, D1 through D4 indicate respective shift positions, marks (○) indicate that the respective manual switches MSW 1 through 4 are on and marks (X) indicate that the respective manual switches MSW 1 through 4 are off.

- Step S3-1-3: Read throttle opening theta (θ).
- Step S3-1-4: Read driving speed v.
- Step S3-1-5: Read the gear change map created for respective shift positions D1 through D4. By way of example, FIG. 14 is a gear change map for the shift position D3.
- Step S3-1-6: Determine a commanded gear ratio $i_{MSW}$ corresponding to the car speed v and throttle opening theta (θ).

Figure 15:
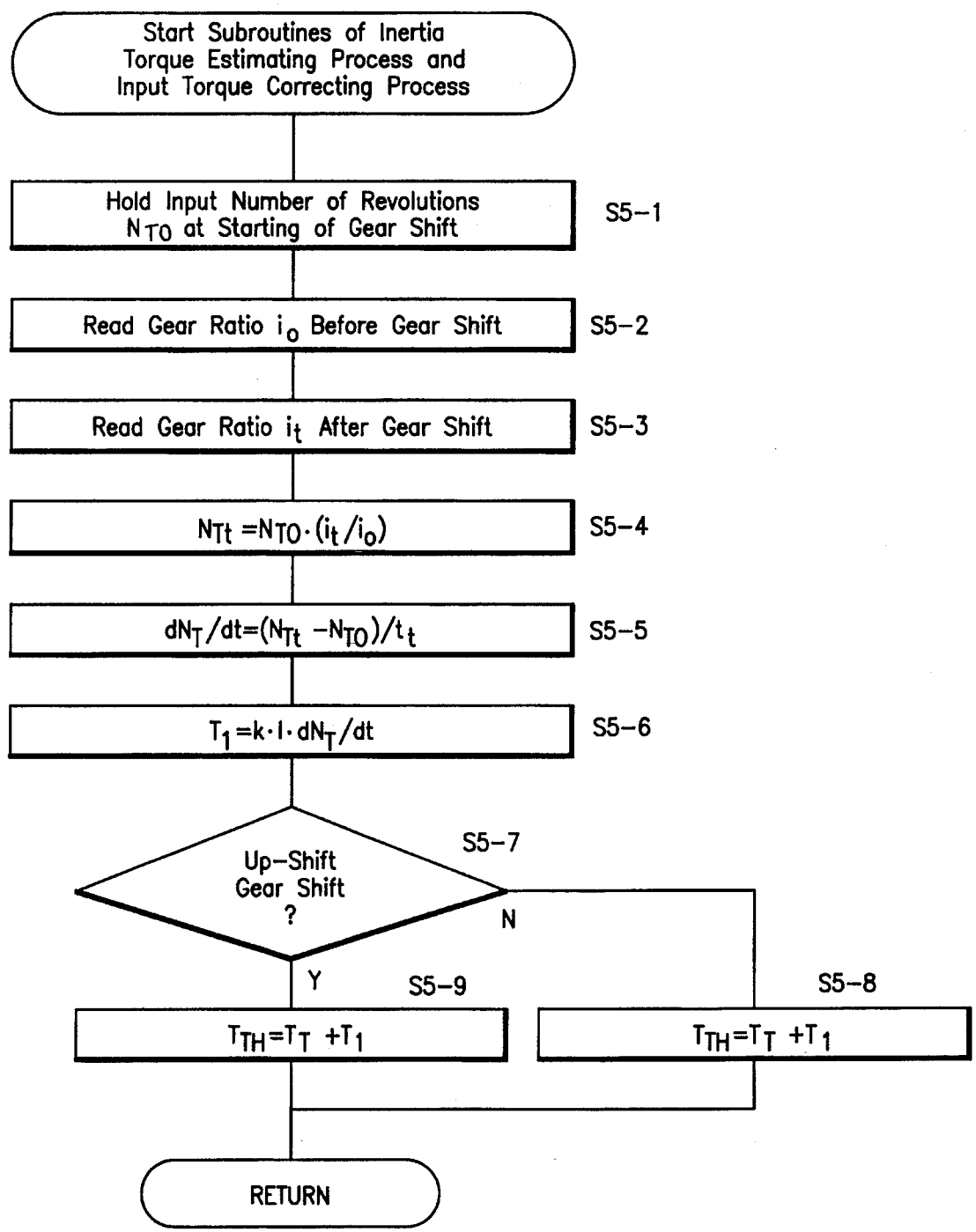
FIG. 15 is a flowchart of a subroutine for inertia torque estimation and input torque correction in the present invention.

Next, subroutines for the inertia torque estimating process and input torque correcting process in Step S5 in FIG. 8 will be explained with reference to FIG. 15.

Step S5-1: Hold an input rotary speed $N_{TO}$ at the start of a gear change.

Step S5-2: Read the current gear ratio $i_{NOW}$ (FIG. 10) as a gear ratio $i_o$ before the gear change.

Step S5-3: Read the commanded gear ratio $i_{MSW}$ as a gear ratio it after the gear change.

Step S5-4: Calculate a targeted input rotary speed after the gear change $N_{Ti}$; $N_{Ti}=N_{TO}$ ($i_i/i_o$).

Step S5-5: Calculate a rate of change for input rotary speed during the gear change ($dN_T/dt$), based on the targeted gear change time $t_t$, the targeted input rotary speed $N_{Ti}$, the input rotary speed at the start of the gear change $N_{TO}$, utilizing the targeted gear change time map in FIG. 6; $dN_T/dt=(N_{Ti}-N_{TO})/t_t$ Step S5-6: Calculate an inertia torque $T_I$ based on the moment of inertia I of the rotary member on the input side of the frictional engagement element and $dN_T/dt$; $T_I=k * I * dN_T/dt$ (k: constant)

Step S5-7: Determine whether or not the gear change command in Step S3-4 in FIG. 10 is that for an up-shift. If it is that for an up-shift, advance to Step S5-9 and if it is not that for an up-shift, advance to Step S5-8.

Step S5-8: Calculate the required operating torque $T_{TM}$ by correcting the input torque $T_T$; $T_{TM}=T_T+T_I$ ($T_I<0$)

Step S5-9: Calculate the required operating torque $T_{TM}$ by correcting the input torque $T_T$; $T_{TM}=T_T+T_I$ ($T_I>0$)

Figure 16:
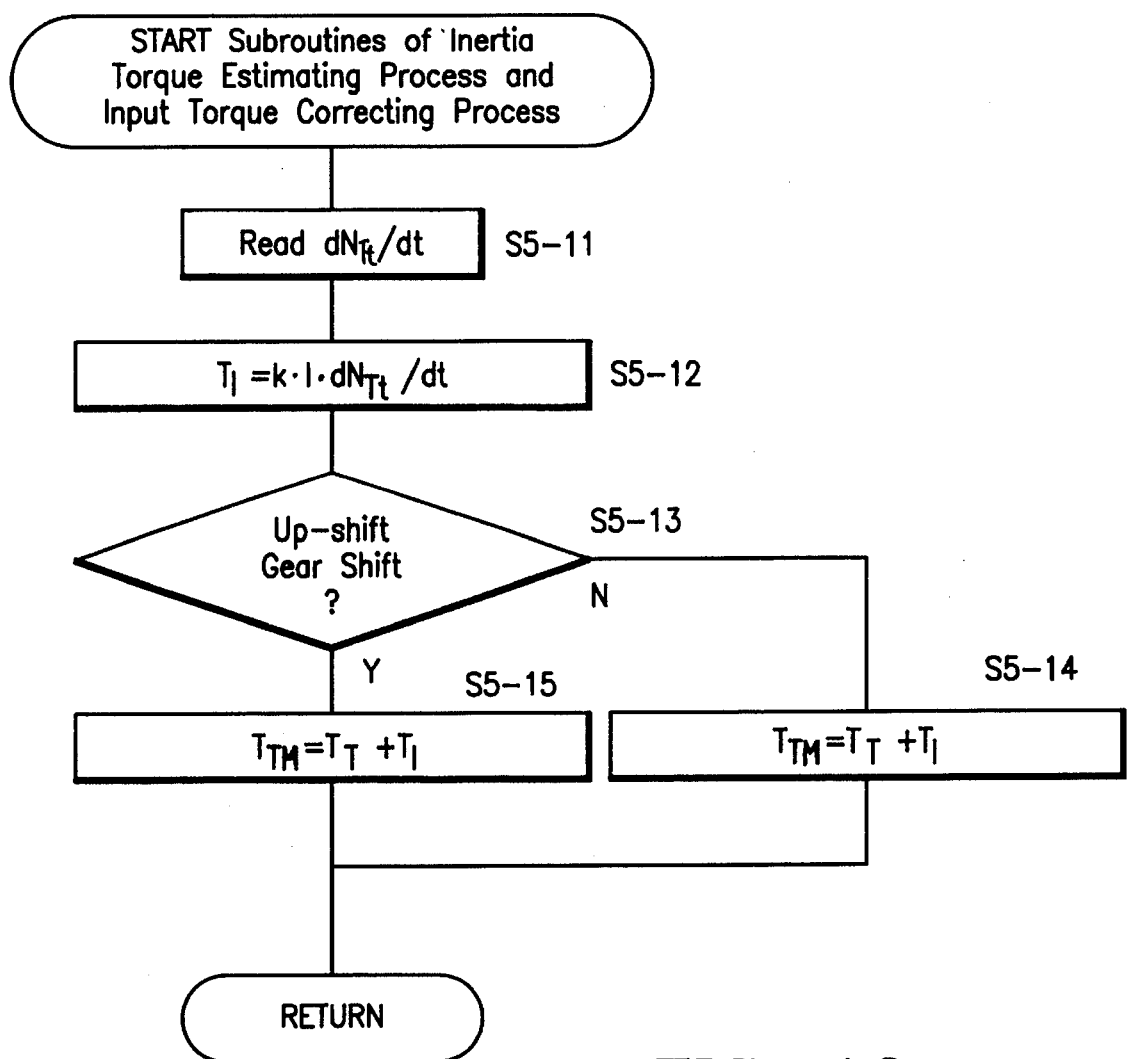
FIG. 16 is a flowchart of another subroutine for inertia torque estimation and input torque correction in the present invention.
Figure 17:
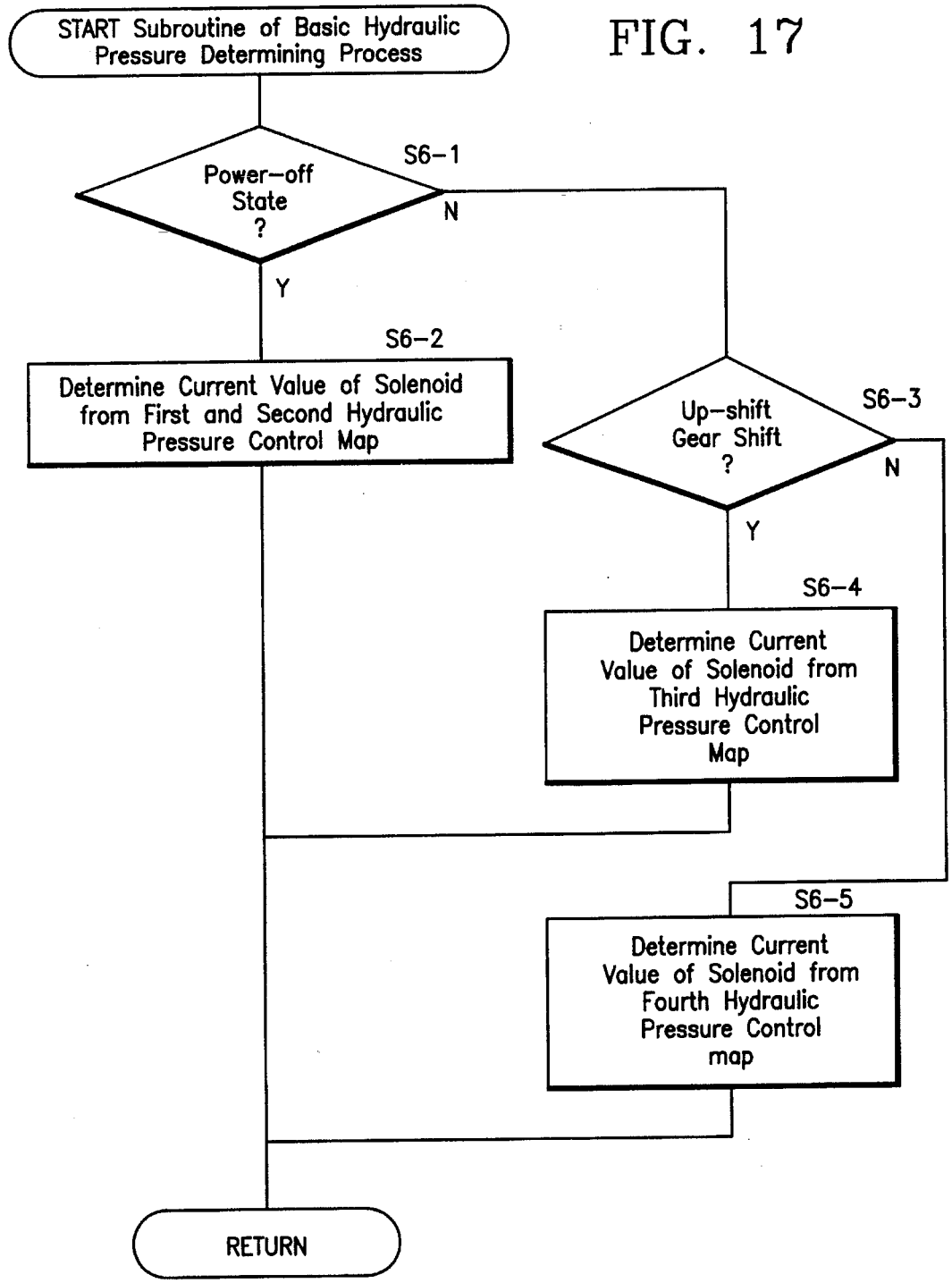
FIG. 17 is a flowchart of a subroutine for basic hydraulic pressure determination according to the present invention.

Next, an alternative subroutine for an inertia torque estimating process and input torque correcting process will be explained with reference to FIG. 16. In this case, the targeted rate of change in rotary speed $dN_{Tt}/dt$ is read from the map in FIG. 7.

Step S5-11: Read the targeted value for the rate of change of the targeted rotary speed $dN_{rt}/dt$ from the map in FIG. 7.

Step S5-12: Calculate the inertia torque $T_I$ based on the moment of inertia I of the rotary member on the input side of the frictional engagement element and the targeted value $dN_{rt}/dt$; $T_I=k * I * dN_{Tt}/dt$ Step S5-13: Determine whether or not the gear change command in Step S3-4 in FIG. 10 is that for an up-shift. If it is that for a down-shift, advance to Step S5-14 and if it is of up-shift, advance to Step S5-15.

Step S5-14: Calculate a required operating torque $T_{TM}$ by correcting the input torque $T_T$; $T_{TM}=T_T+T_I$ ($T_I<0$)

Step S5-15: Calculate the required operating torque $T_{TM}$ by correcting the input torque $T_T$; $T_{TM}=T_T+T_I$ ($T_I>0$)

Next, a subroutine for the basic hydraulic pressure determining process will be explained with reference to FIGS. 17-21.

Step S6-1: Determine whether or not in a power-off state. If in the power-off state, advance to Step S6-2 and if not in the power-off state, advance to Step S6-3.

Figure 18:
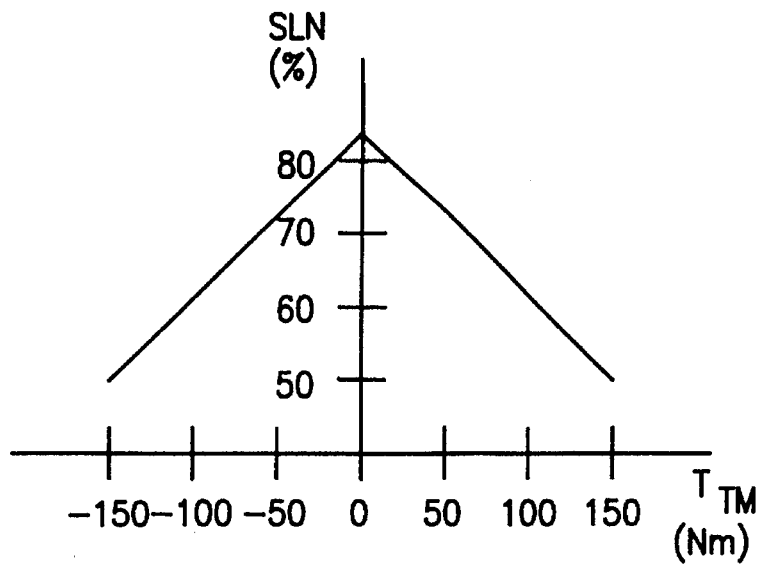
FIG. 18 is a graph showing a first hydraulic pressure control map usable in the present invention.
Figure 19:
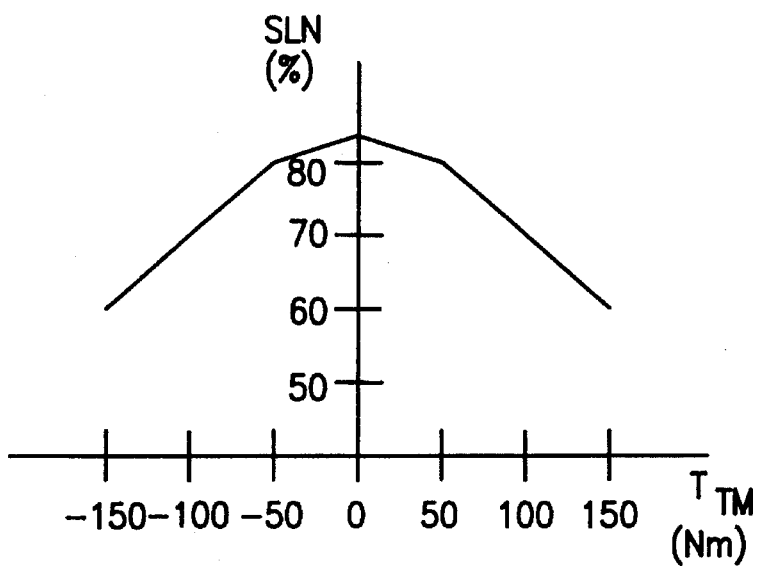
FIG. 19 is a graph showing a second hydraulic pressure control map usable in the present invention.

Step S6-2: Determine a value of current to be supplied to a solenoid (not shown) in the linear solenoid valve SLN (FIG. 5) by reference to the first and second hydraulic pressure control maps in FIGS. 18 and 19. The first hydraulic pressure control map in FIG. 18 represents the case where an up-shift gear change to the second speed is to be made in the power-off state and allows for determination of a value of current to be supplied to the solenoid valve of the linear solenoid valve SLN by application of the required operating torque $T_{TM}$ for the hydraulic pressure servo 51 (FIG. 1) of the first brake B1 (FIG. 2) as a parameter. The second hydraulic pressure control map in FIG. 19 represents the case where a down-shift gear change to the first speed is made in the power-off state and allows for determination of a value of current supplied to the solenoid valve of the linear solenoid valve SLN, by applying the required operating torque $T_{TM}$ for the hydraulic pressure servo 51 of the third brake B3 as a parameter.

Step S6-3: Determine whether or not the gear change command in Step S3-4 in FIG. 10 is that for an up-shift. If it is for an up-shift, advance to Step S6-4 and if it is for a down-shift, advance to Step S6-5.

Figure 20:
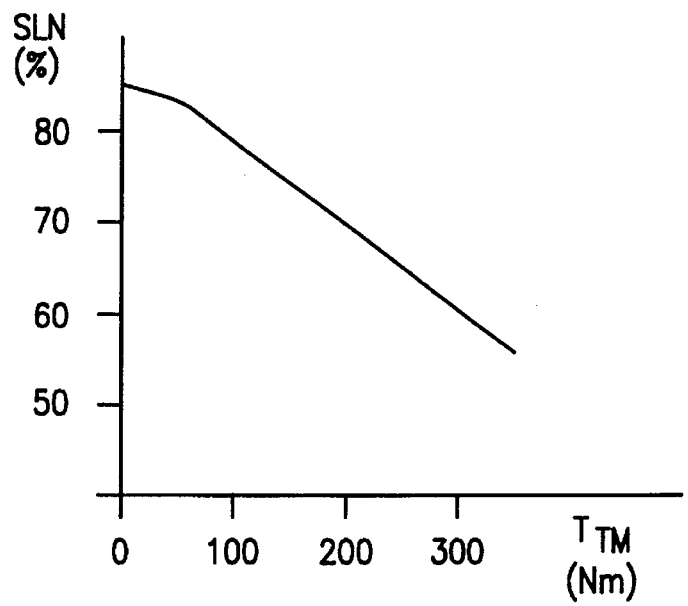
FIG. 20 is a graph showing a third hydraulic pressure control map usable in the present invention.

Step S6-4: Determine a value of current to be supplied to the solenoid of the linear solenoid valve SLN from the third hydraulic pressure control map in FIG. 20. The third hydraulic pressure control map in FIG. 20 represents the case where an up-shift gear change to the second speed is to be made in the power-on state and allows for determination of value of current to be supplied to the solenoid valve of the linear solenoid valve SLN, by applying the required operating torque $T_{TM}$ of the hydraulic pressure servo 51 of the second brake B2 to the map as a parameter.

Figure 21:
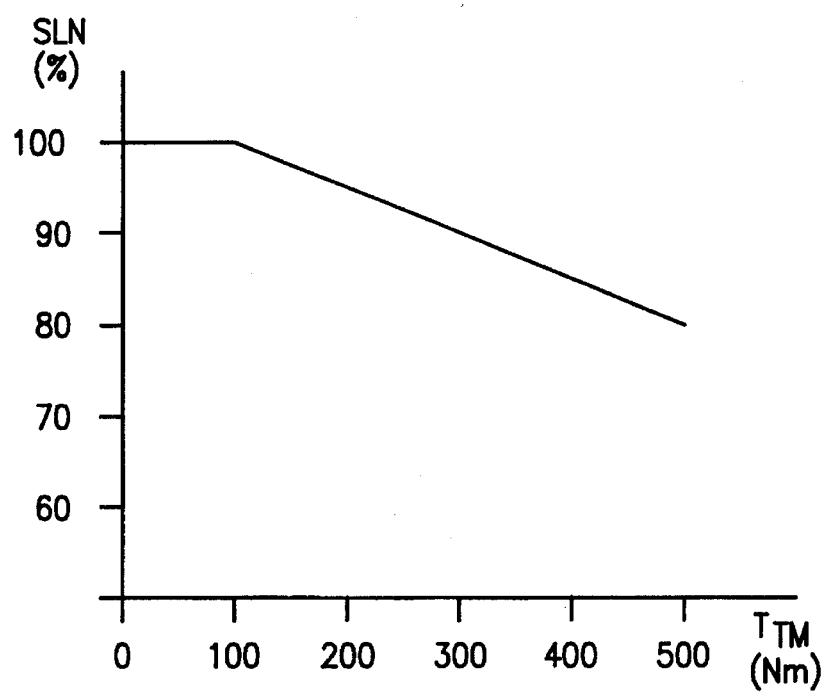
FIG. 21 is a graph showing a fourth hydraulic pressure control map usable in the present invention.

Step S6-5: Determine a value of current to be supplied to the solenoid of the linear solenoid valve SLN from the fourth hydraulic pressure control map in FIG. 21. The fourth hydraulic pressure control map in FIG. 21 represents the case where a down-shift gear change to the first speed is to be made in the power-on state and allows for determination of the value of current to be supplied to the solenoid valve of the linear solenoid valve SLN, by applying the required operating torque $T_{TM}$ of the hydraulic pressure servo 51 for the second brake B2 to the map as a parameter.

While the above describes determination of the value of current supplied to the solenoid valve of the linear solenoid valve SLN, by employing the first and third hydraulic pressure control maps, only in the context of an up-shift gear change, the value of current to be supplied to the solenoid valve of the linear solenoid valve SLN may be determined by resort to a hydraulic pressure control map using other parameters such as the car speed v during the down-shift gear change.

Figure 22:
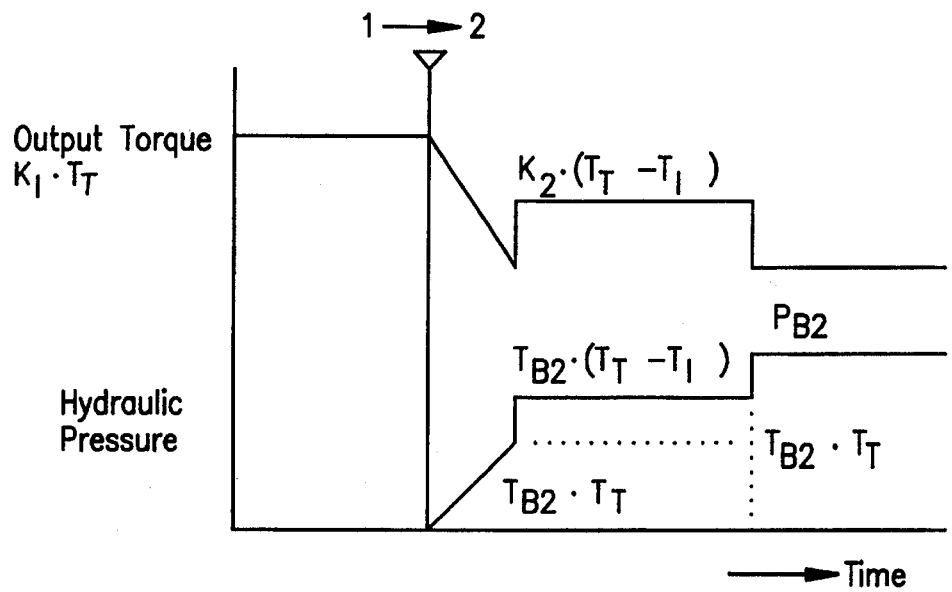
FIG. 22 is a graph showing an example of optimum brake torque during an up-shift gear change in accordance with the present invention.
Figure 23:
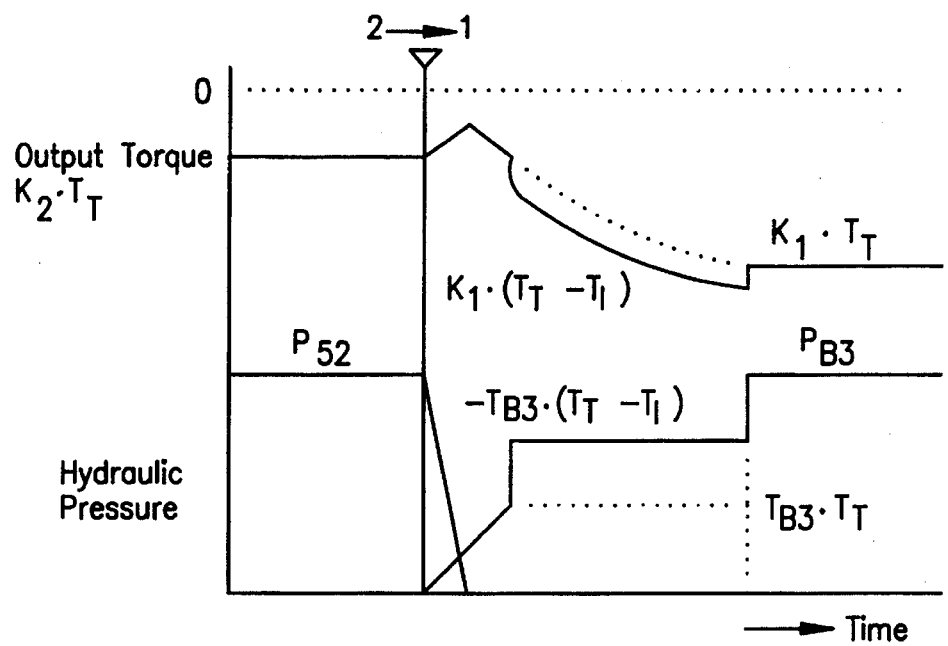
FIG. 23 is a graph showing an example of optimum brake torque during a down-shift gear change in accordance with the present invention.

In FIGS. 22 and 23 $K_1$ denotes a gear ratio in the first speed, $K_2$ a gear ratio in the second speed, $T_T$ an input torque, $T_I$ an inertia torque, $T_{B2}$ the torque apportioned to the second brake B2 (FIG. 2), $T_{B3}$ the torque apportioned to the third brake B3, $P_{B2}$ operating pressure to the hydraulic servo B-2 and $P_{B3}$ an operating pressure to the hydraulic servo B-3.

Figure 24:
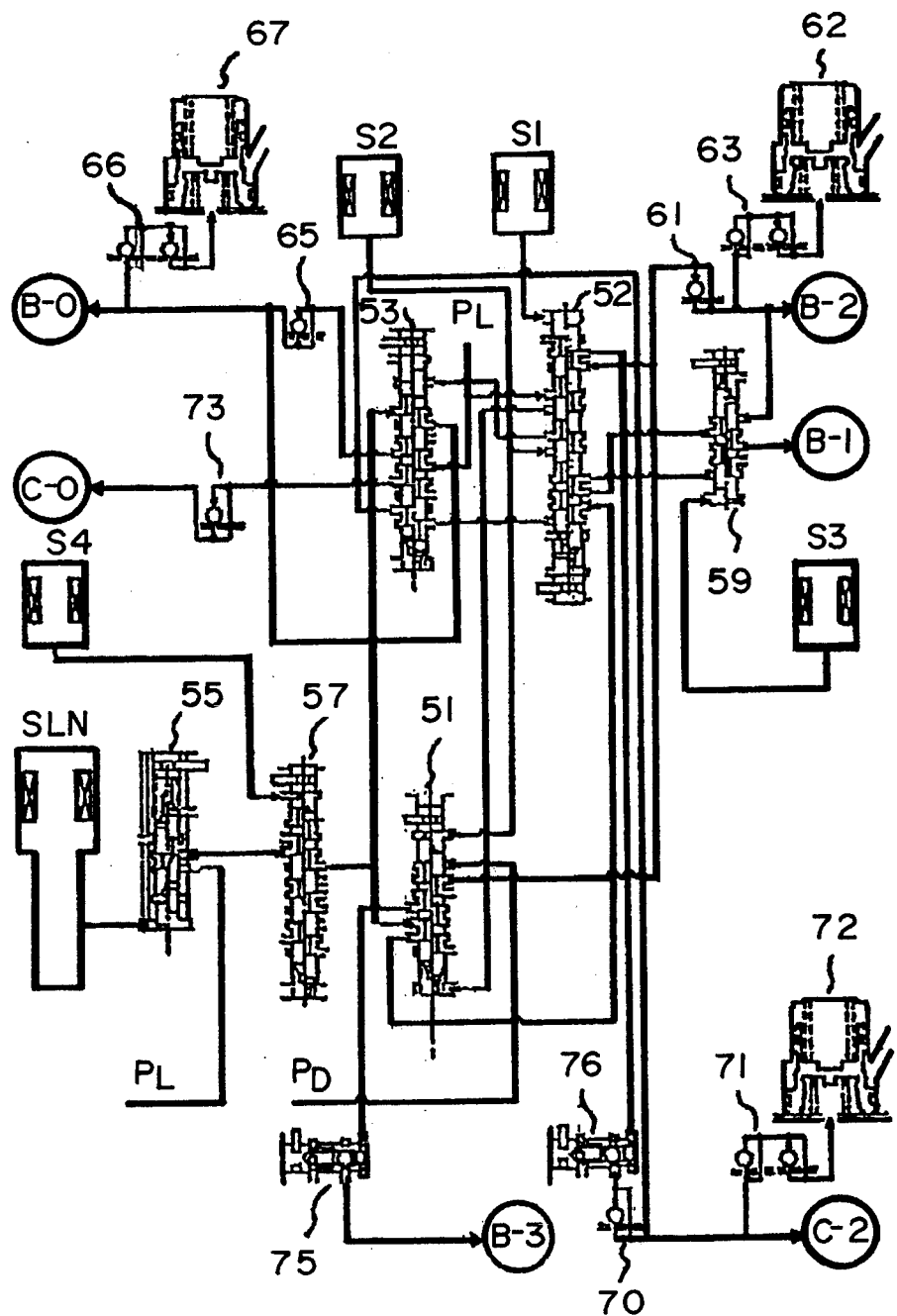
FIG. 24 is a hydraulic circuit diagram in accordance with an embodiment of the present invention.

In FIG. 24, the reference character $P_L$ denotes a line pressure, $P_n$ a D range pressure, 51 a 1–2 shift valve for making a 1–2 gear change, 52 a 2–3 shift valve for making a 2–3 gear change, 53 a 3–4 shift valve for making a 3–4 gear change, 55 a pressure control valve, 57 an engine brake control valve and 59 a B-1 timing valve.

Further, the reference numeral B-1 denotes a hydraulic servo for the first brake B1 (FIG. 2), B-2 a hydraulic servo for the second brake B2, B-3 a hydraulic servo for the third brake B3, B-0 a hydraulic servo for the fourth brake B0, C-2 a hydraulic servo for the second clutch C2 and C-0 a hydraulic servo for the third clutch C0.

The hydraulic servo B-2 is supplied with oil via an orifice valve 61 and the operating pressure to the hydraulic servo B-2 is governed by an accumulator 62 connected via an orifice valve 63. The hydraulic servo B-0 is supplied with oil via an orifice valve 65 and the operating pressure of the hydraulic servo B-0 is governed by an accumulator 67 connected via an orifice valve 66. The hydraulic servo C-2 is supplied with oil via an orifice valve 70 and the operating pressure of the hydraulic servo C-2 is governed by an accumulator 72 connected via an orifice valve 71.

The reference numeral 73 denotes an orifice valve connected to the hydraulic servo C-0, 75 a check valve connected to the hydraulic servo B-3 and 76 a check valve connected to the orifice valve 70.

The reference numeral S1 denotes a solenoid valve for switching the 2–3 shift valve 52, S2 a solenoid valve for switching the 1–2 shift valve 51 and the 3–4 shift valve 53, S3 a solenoid valve for switching the B-1 timing valve 59, S4 a solenoid valve for switching the engine brake control valve 57 and SLN the linear solenoid valve for governing the pressure of the pressure control valve 55.

In the hydraulic circuit described above, each solenoid of the solenoid valves S1 through S4 becomes ON when the 1–2 gear change is made. At this time, the 1–2 shift valve 51, the 2–3 shift valve 52, the 3–4 shift valve 53 and the engine brake control valve 57 assume the left half position in the drawing (hereinafter referred to as the "left half position") and the B-1 timing valve 59 comes into the right half position in the drawing (hereinafter referred to as the "right half position").

As a result, oil at the D range pressure $P_n$ is supplied to the orifice valve 61 via the 1–2 shift valve 51 and its pressure is regulated by the orifice valve 61 and that regulated pressure is supplied to the hydraulic servo B-2. At this time, the operating pressure to the hydraulic servo B-2 is governed by the accumulator 62 to which oil is supplied via the orifice valve 63. The hydraulic servo C-0 is supplied with oil from the time of first speed. Thus, the hydraulic servo B-2 can be supplied with oil by the limited oil supplying circuit created via the orifice valve 61.

When the 1–2 gear change is made while controlling the operating pressure, each solenoid of the solenoid valves S1 and S2 turns on and each solenoid of the solenoid valves S3 and S4 turns off. At this time, the 1–2 shift valve 51, the 2–3 shift valve 52, the 3–4 shift valve 53 and the B-1 timing valve 59 come into the left half position and the engine brake control valve 57 comes into the right half position. Further, the line pressure $P_L$ is governed by the pressure control valve 55 by operation of linear solenoid valve SLN.

Accordingly, oil at a controlled pressure is supplied to the hydraulic servo B-2 via the engine brake control valve 57, the 1–2 shift valve 51, the 2–3 shift valve 52 and the B-1 timing valve 59.

Next, when the 2–3 gear change is made, the solenoid of the solenoid valve S1 turns off and each solenoid of the solenoid valves S2 through S4 turns on. At this time, the 1–2 shift valve 51, the 3–4 shift valve 53 and the engine brake control valve 57 come into the left half position and the 2–3 shift valve 52 and the B-1 timing valve 59 come to the right half position.

As a result, oil at D-range pressure $P_n$ is supplied to the orifice valve 70 via the 1–2 shift valve 51, the 2–3 shift valve 52 and check valve 76 and, after its pressure is regulated by the orifice valve 70, it is supplied to the hydraulic servo C-2. At this time, the operating pressure of the hydraulic servo C-2 is controlled by the accumulator 72 to which oil is supplied via the orifice valve 71. Incidentally, the hydraulic servo C-0 and hydraulic servo B-2 are supplied with oil from the time of the second speed. Thus, the hydraulic servo C-2 can be supplied with oil by the limited oil supplying circuit created via the orifice valve 70.

When the 2–3 gear change is made while controlling the operating pressure, each solenoid of the solenoid valves S1 and S4 is turned off and each solenoid of the solenoid valves S2 and S3 is turned on. At this time, the 1–2 shift valve 51 and the 3–4 shift valve 53 come into the left half position and the 2–3 shift valve 52, the engine brake control valve 57 and the B-1 timing valve 59 come into the right half position. Further, the line pressure $P_L$ is governed by the pressure control valve 55 by operation of the linear solenoid valve SLN.

Accordingly, oil under the controlled pressure is supplied to the hydraulic servo C-2 via the engine brake control valve 57, the 1–2 shift valve 51, the 2–3 shift valve 52 and the 3–4 shift valve 53.

Next, when a 3–4 gear change is made, each solenoid of the solenoid valves S1 and S2 turns off and each solenoid of the solenoid valves S3 and S4 turns on. At this time, the 1–2 shift valve 51 and the engine brake control valve 57 come into the left half position and the 2–3 shift valve 52 and the 3–4 shift valve 53 and the B-1 timing valve 59 come into the right half position.

As a result, oil at the D range pressure $P_n$ is supplied to the orifice valve 65 via the 3–4 shift valve 53. Pressure governed by the orifice valve 65 is supplied to the hydraulic servo B-0. At this time, the operating pressure of the hydraulic servo B-0 is controlled by the accumulator 67 to which oil is supplied via the orifice valve 66. The hydraulic servo C-2 and hydraulic servo B-2 have been supplied with oil from the time of the third speed up to this point.

Thus, the hydraulic servo B-2 can be supplied with oil by the limited oil supplying circuit created via the orifice valve 65.

When the 3–4 gear change is made while controlling the operating pressure, each solenoid of the solenoid valves S1, S2 and S4 turns off and the solenoid of the solenoid valve S3 turns on. At this time, the 1–2 shift valve 51 comes into the left half position and the 2–3 shift valve 52, the 3–4 shift valve 53, the engine brake control valve 57 and the B-1 timing valve 59 come into the right half position. Further, the line pressure $P_L$ is governed by the pressure control valve 55 by operation of the linear solenoid valve SLN.

Accordingly, oil under the controlled pressure is supplied to the hydraulic servo B-0 via the engine brake control valve 57 and the 3–4 shift valve 53.

When the engine is braked in the first speed, each solenoid of the solenoid valves S1 and S3 turns on and each solenoid of the solenoid valves S2 and S4 turns off. At this time, the 2–3 shift valve 52 and the 3–4 shift valve 53 come into the left half position and the 1–2 shift valve 51, the B-1 timing valve 59 and the engine brake control valve 57 come into the right half position. Further, the line pressure $P_L$ is governed by the pressure control valve 55 by operation of the linear solenoid valve SLN. As a result, oil under the controlled pressure $P_n$ is supplied to the hydraulic servo B-3 via the engine brake control valve 57, the 1–2 shift valve 51 and check valve 75.

When the engine is braked in the second speed, each solenoid of the solenoid valves S1 through S3 turns on and the solenoid of the solenoid valve S4 turns off. At this time, the 1–2 shift valve 51, the 2–3 shift valve 52 and the 3–4 shift valve 53 come into the left half position and the B-1 timing valve 59 and the engine brake control valve 57 come into the right half position. Further, the line pressure $P_L$ is governed by the pressure control valve 55 by operation of the linear solenoid valve SLN. As a result, oil under the controlled pressure $P_n$ is supplied to the hydraulic servo B-1 via the engine brake control valve 57, the 1–2 shift valve 51, the 2–3 shift valve 52 and the B-1 timing valve 59.

As described above, oil can be supplied to each hydraulic servo B-2, B-0 and C-0, not only by the limited oil supplying circuit created via the orifice valves 61, 65 and 70, but also by the controlled oil pressure supplying circuit created without going through the orifice valves 61, 65 and 70 when the 1–2, 2–3 and 3–4 gear changes are made. The operating pressure of each of the hydraulic servos B-2, B-0 and C-2 is thereby increased and controlled, to engage the second brake B2, fourth brake B0 and second clutch C2 and thereby shorten the gear change time. Further, because the operating pressure can be generated directly by the linear solenoid valve SLN, the operating pressure in the transient state may be accurately controlled.

Further, when the engine is braked in the first and second speed, each hydraulic servo B-3 and B-1 can be supplied with oil by the controlled pressure oil supplying circuit.

On the other hand, because the limited oil supplying circuit is provided, oil at the line pressure $P_L$ can be supplied to a predetermined hydraulic servo even in the case of a failure, thereby maintaining control of the gear change.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A hydraulic control system for an automatic transmission which is coupled to an output shaft of an engine and which is shifted by selectively engaging and disengaging a plurality of frictional engagement elements, said control system comprising:

a plurality of hydraulic servos, each hydraulic servo engaging and disengaging one of the plurality of frictional engagement elements;

oil supplying means for supplying oil to a selected hydraulic servo for engaging a selected frictional engagement element in the course of a gear change to a targeted gear ratio;

input torque determining means for determining input torque input to said transmission;

inertia torque estimating means for estimating an inertia torque corresponding to a rate of change in rotary speed of a rotary component of said transmission during the gear change;

input torque correcting means for calculating a required operating torque by adding said determined input torque and said inertia torque; and operating pressure control means for controlling pressure of the oil supplied to the selected hydraulic servo to correspond to said required operating torque.

2. The hydraulic control system of claim 1 wherein said inertia torque estimating means estimates the inertia torque by multiplying the rate of change of the rotary speed of said rotary component during the gear change by a constant equivalent to a moment of inertia of said rotary member.

3. The hydraulic control system of claim 1 further comprising an input rotation sensor for detecting the rotary speed of said rotary component, said rotary component being located on the input side of said selected frictional engagement element, and wherein said inertia torque estimating means calculates a targeted input rotary speed from the rotary speed detected by said input rotation sensor and gear ratios before and after the gear change, calculates a rate of change of rotary speed during the gear change by dividing the difference between said targeted input rotary speed and the detected rotary speed at the start of the gear change by a targeted gear change time and estimates the inertia torque by multiplying said calculated rate of change of rotary speed by a constant for moment of inertia of the rotary component.

4. The hydraulic control system of claim 3, wherein said input rotation sensor detects the rotary speed of an input shaft of the transmission, the rotary speed of the engine or the rotary speed of a drum of said selected frictional engagement element.

5. The hydraulic control system of claim 3, wherein said inertia torque estimating means includes a targeted gear change time map and wherein said inertia torque estimating means reads said targeted gear change time from said targeted gear change time map.

6. The hydraulic control system of claim 5, wherein said targeted gear change time map has said input rotary speed at the start of the gear change plotted against input torque.

7. The hydraulic control system of claim 5, wherein said targeted gear change time map has said input rotary speed at the start of the gear change plotted against $i_t/i_o$ wherein $i_t$ is the gear ratio after the gear change and $i_o$ is the gear ratio before the gear change.

8. The hydraulic control system of claim 1, wherein said inertia torque estimating means includes a targeted rate of change of rotary speed map in which targeted values for rate of change of rotary speed of said rotary component during the gear change are plotted against targeted gear change time and wherein said inertia torque estimating means reads a targeted value from said map and multiplies the read targeted value by a constant equivalent to the moment of inertia of said rotary component to obtain said inertia torque.

9. The hydraulic control system of claim 8, further comprising a gear change feel select switch for manually selecting a gear change feel from among multiple choices and wherein said map has a plurality of plots, each plot corresponding to one of said multiple choices, and wherein said inertia torque estimating means selects one of said plots for reading said targeted value in accordance with an output signal from said gear change feel select switch.

10. The hydraulic control system of claim 1, wherein said input torque correcting means calculates said required operating torque by adding said determined input torque and said inertia torque during the gear change and sets said required operating torque equal to said determined input torque when no gear change is being made.

11. The hydraulic control system of claim 1, further comprising an accumulator, in hydraulic communication with said selected hydraulic servo, for controlling gear change transient characteristics in operation of said selected hydraulic servo, said operating pressure control means controlling said operating pressure by controlling a back pressure of said accumulator in accordance with said required operating torque.

* * * * *